US012811123B2

(12) United States Patent
Schneider et al.

(10) Patent No.: US 12,811,123 B2
(45) Date of Patent: Nov. 24, 2026

(54) OPTIMIZATION OF DMS SEPARATIONS USING ACOUSTIC EJECTION MASS SPECTROMETRY (AEMS)

(71) Applicant: DH TECHNOLOGIES DEVELOPMENT PTE. LTD., Singapore (SG)

(72) Inventors: Bradley B. Schneider, Bradford (CA); Leigh Bedford, Ajax (CA); Chang Liu, Richmond Hill (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 255 days.

(21) Appl. No.: 18/686,618

(22) PCT Filed: Sep. 7, 2022

(86) PCT No.: PCT/IB2022/058427
§ 371 (c)(1),
(2) Date: Feb. 26, 2024

(87) PCT Pub. No.: WO2023/037267
PCT Pub. Date: Mar. 16, 2023

(65) Prior Publication Data

US 2024/0379338 A1 Nov. 14, 2024

Related U.S. Application Data

(60) Provisional application No. 63/242,645, filed on Sep. 10, 2021.

(51) Int. Cl.

| | |
|---|---|
| ***H01J 49/04*** | (2006.01) |
| ***G01N 27/624*** | (2021.01) |
| ***H01J 49/00*** | (2006.01) |

(52) U.S. Cl.
CPC ........ *H01J 49/0454* (2013.01); *G01N 27/624* (2013.01); *H01J 49/0009* (2013.01); *H01J 49/004* (2013.01)

(58) Field of Classification Search
CPC .. H01J 49/0454; H01J 49/0009; H01J 49/004; G01N 27/624; G01N 27/623
See application file for complete search history.

(56) References Cited

U.S. PATENT DOCUMENTS

2002/0171037 A1* 11/2002 Ellson .............. G01N 33/54393 250/288
2002/0195558 A1* 12/2002 Ellson ................. H01J 49/0454 250/288

(Continued)

FOREIGN PATENT DOCUMENTS

WO WO-2021234643 A1 * 11/2021 .......... H01J 49/0454
WO WO-2021234644 A1 * 11/2021 .......... H01J 49/0009

(Continued)

OTHER PUBLICATIONS

International Search Report and Written Opinion corresponding to International Patent Application No. PCT/IB2022/058427, mailed Dec. 19, 2022.

(Continued)

*Primary Examiner* — David A Vanore
(74) *Attorney, Agent, or Firm* — Lathrop GPM LLP; Malaika O. D. Tyson; Jason A. Kuchar

(57) ABSTRACT

Disclosed are methods and systems that provide for the analysis of one or more analytes of interest in an acoustic ejection mass spectrometer (AEMS) system that incorporates an open port interface (OPI) and differentiation mass spectrometry (DMS) that allows for operation of the system in a pseudo-continuous mode to scan and determine optimal DMS settings for the one or more analytes of interest, and (Continued)

for operation of the system in a discontinuous mode to analyze for the presence of the one or more analytes of interest in a sample.

19 Claims, 16 Drawing Sheets

(56) References Cited

U.S. PATENT DOCUMENTS

2019/0157061 A1* 5/2019 Datwani ............. H01J 49/0454
2021/0109069 A1* 4/2021 Jones .................. H01J 49/0031

FOREIGN PATENT DOCUMENTS

WO WO-2021234645 A1 * 11/2021 ............ H01J 49/165
WO WO-2022137120 A1 * 6/2022 .......... H01J 49/0431
WO WO-2022238945 A1 * 11/2022 .......... H01J 49/0454
WO WO-2023012724 A1 * 2/2023 .......... H01J 49/0454
WO WO-2023037267 A1 * 3/2023 ............ H01J 49/004
WO WO-2023047366 A1 * 3/2023 .......... H01J 49/0404
WO WO-2023199273 A1 * 10/2023 .......... H01J 49/0431
WO WO-2025062288 A1 * 3/2025 .......... H01J 49/0027

OTHER PUBLICATIONS

Liu Chang et al, "Fluid Dynamics of the Open Port Interface for High-Speed Nanoliter Volume Sampling Mass Spectrometry", US Jun. 10, 2021 (Jun. 10, 2021), vol. 93, No. 24, p. 8559-8567, Retrieved from the Internet: URL:https://pubs.acs.org/doi/pdf/10.1021/acs.analchem.1c01312 XP055881038.

Zhang Hui et al, "Acoustic Ejection Mass Spectrometry for High-Throughput Analysis", US Jul. 28, 2021 (Jul. 28, 2021), vol. 93, No. 31, p. 10850-10861, Retrieved from the Internet: URL:https://pubs.acs.org/doi/pdf/10.1021/acs.analchem.1c01137 XP055919116.

Liu Chang et al, "Fast quantitation of opioid isomers in human plasma by differential mobility spectrometry/mass spectrometry via SPME/open-port probe sampling interface", Analytica Chimica Acta, Elsevier, Amsterdam, NL, vol. 991, Aug. 28, 2017 (Aug. 28, 2017), p. 89-94, XP085211593.

PCT, "International Preliminary Report on Patentability," regarding Application No. PCT/IB2022/058427, 7 pages, mailed Mar. 21, 2024.

* cited by examiner

OPTIMIZATION OF DMS SEPARATIONS USING ACOUSTIC EJECTION MASS SPECTROMETRY (AEMS)

RELATED APPLICATIONS

The present application is filed pursuant to 35 U.S.C. 371 as a U.S. National Phase application of International Patent Application No. PCT/IB2022/058427, which was filed Sep. 7, 2022, claiming the benefit of U.S. Provisional Application No. 63/242,645, filed Sep. 10, 2021, the content of each is hereby incorporated by reference in its entirety into this disclosure.

BACKGROUND

The development of acoustic droplet ejectors (ADE) and open probe interfaces (OPI) has enabled unprecedented sample throughput for analysis by mass spectrometry (MS) (i.e., acoustic ejection mass spectrometry (AEMS)). Nevertheless, because of the difficulty associated with coupling liquid chromatographic (LC) separations with AEMS, the technique can still suffer from certain challenges such as, for example, potential isobaric interferences within the sample components that are inseparable by mass filtering in the MS. Conventional LC-MS takes advantage of the separation provided by the LC column to avoid these issues by separating the interfering compounds based on mobility, at the cost of longer sample run time and system complexity.

Differential mobility spectrometry (DMS) has been developed as an alternative approach to LC separations and can help resolve potential isobaric interferences by selecting ions of interest based on the differences in the ion mobility in high- and low-field, rather than mass filtering in the MS. DMS can be incorporated in a mass spectrometer downstream of the ion source and OPI device, and can achieve separations on the millisecond time scale. For example, DMS has been successfully coupled with an OPI when using solid phase microextraction (SPME) for sample transfer (Liu et al., "Fast Quantitation of Opioid Isomers in Human Plasma by DMS/MS via SPME/Open Port Probe Sampling Interface", *Anal. Chim. Acta,* 2017, 991, 89-94).

Existing techniques that incorporate DMS, however, require the determination of DMS settings and can require substantial modification of the ion source. Despite experimental success, as illustrated above, there is no current commercial OPI-DMS-MS offering, in part due to the difficulty in determining DMS settings by conventional methods. For instance, conventional infusion approaches are typically conducted at rate of 10 μL/min, whereas OPI typically operates with carrier fluid flowing around 300 μL/min. The order of magnitude difference in solvent flow rates requires very different source temperature conditions, invalidating the compensation voltage (CoV) values determined by a conventional infusion method.

Furthermore, ADE-OPI sampling commonly operates on a relatively short timescale, with a typical single sampling event lasting less than a second. In this manner, successive sampling events may be completed at a rate of 1 sample per second (i.e. 1 Hz), and in some cases with multiplexing successive sampling events may be completed at higher rates, such as 3 samples per second (i.e. ~3 Hz). With short duration sampling, it is difficult to determine appropriate DMS settings, and accordingly, existing experimental techniques have only utilized the DMS settings as determined from the initial infusion optimization as a first approximation for the relevant/correct CoV for a compound of interest, and have required additional ramping or testing of CoV when the alternative sample delivery system (i.e., OPI, ADE/OPI) was incorporated.

As such, a DMS approach has not been conducive to high throughput analysis because it has involved substantial modification of the ion source when determining DMS settings (e.g., switching between infusion-based compensation voltage (CoV) ramping and sampling using the OPI device). Further, prior approaches have not enabled the direct determination of the optimal CoV values for OPI operation (e.g., settings for maximum sensitivity or optimal selectivity).

This disclosure provides methods and systems that overcome the prior challenges associated with sample analysis and optimizing DMS settings during analysis in systems such as an AEMS.

SUMMARY

In an embodiment, a method is provided for operating an acoustic ejection mass spectrometer (AEMS) with a differential mobility spectrometer (DMS) for ion selection. The method may include: ejecting a first sample into an open port interface (OPI) to provide a pseudo-continuous signal of ion detection at the mass spectrometer (MS); evaluating ion detection intensity for a plurality of separation voltage (SV)/compensation voltage (CoV) pair settings of the DMS; and, selecting an SV/CoV pair to use for analysis.

The term DMS is inclusive of devices having any geometry and layout, for example, flat planar electrode DMS devices and curved electrode FAIMS DMS devices. In the non-planar arrangements, the terms CoV and SV may be replaced by the terms CV and DV, as conventionally used to describe corresponding voltages applied to the FAIMS DMS device.

In an aspect, the disclosure provides a method for operating an acoustic ejection mass spectrometer (AEMS) with a differential mobility spectrometer (DMS) for ion selection. The method may include, in a pseudo-continuous mode, repeatedly ejecting a volume of a first sample into an open port interface (OPI) (e.g., capture fluid) to provide a pulsed sample dilution that is effectively observable as a pseudo-constant sample dilution at an ion source of a mass spectrometer; the mass spectrometer (MS) receiving ions from the ion source and producing a pseudo-continuous signal of ion detection; and evaluating ion detection intensity for a plurality of separation voltage (SV)/compensation voltage (CoV) pair settings of the DMS; and, selecting an SV/CoV pair to use for analysis. In some embodiments, the step of evaluating ion detection intensity for a plurality of SV/CoV pair settings comprises fixing the SV at a specific value and ramping the CoV over a range of values.

In some embodiments, the method may further comprise, in a discontinuous mode, ejecting a volume of a second sample into the OPI to provide a discontinuous sample dilution at the ion source of the MS, the MS receiving ions from the ion source and producing a discontinuous signal of ion detection; applying the selected SV/CoV pair to the DMS; and analyzing second sample ions detected by the MS. The volume of the second sample may comprise, for example, one or more sample droplet ejections that are ejected into a capture fluid flowing through the OPI under conditions that provide for different sample dilutions within the capture fluid.

Thus, in embodiments, pseudo-continuous sample introduction is operable under conditions where discrete ejection events of sample into an OPI occur at a frequency that provides a sample dilution within the capture fluid that is generally consistent (pseudo-consistent or pseudo-constant and infusion-like) over a given sampling period. For purposes of general reference and comparison, under typical non-infusion like acquisition conditions in the art, (i.e., discontinuous acquisition) ADE-OPI sample introduction is performed as fast as possible with individual samples being introduced around 1 Hz apart with each sampling event, i.e. duration of droplet ejection, being <0.5 s.

In some embodiments, the first sample comprises a reference standard.

In some embodiments of the method, the first sample and the second sample comprise an analysis sample for evaluation.

In some embodiments of the method, evaluating ion detection intensity for a plurality of SV/CoV pair settings of the DMS comprises ramping CoV over a plurality of values for at least one SV. In some further embodiments, the method may further comprise ramping CoV over a plurality of values for each of a plurality of SV values.

In some embodiments, the method may further comprise setting a mass filter operation on the MS to permit passage of ions of interest and exclude ions of a different mass from detection.

In some embodiments of the method, the ejecting to provide a pseudo-continuous signal comprises repeatedly ejecting sample volumes for at least a continuous 10 seconds at a sufficient rate to produce a consistent signal at a downstream mass analyzer. In some further embodiments, the ejecting to provide a pseudo-continuous signal may comprise repeatedly ejecting sample volumes for at least a continuous minute.

In some embodiments, the ejecting to provide a discontinuous signal comprises ejecting the volume of the second sample for less than a continuous 5 seconds, or less than a continuous 2 seconds. In some further embodiments, the ejecting to provide a discontinuous signal comprises ejecting separate volumes of sample at about 0.5 Hz or faster (i.e., at higher frequency/cycles).

In some embodiments of the method, the ejecting to provide a discontinuous signal comprises ejecting a volume of the second sample of less than about 300 nL, pausing for at least 0.2 seconds, and ejecting a subsequent volume of a subsequent sample of less than about 300 nL. In some aspects, the subsequent volume of sample is ejected from a different sample reservoir. In some aspects, the volume of the second sample and the subsequent volume of the subsequent sample each comprise a plurality of droplets ejected at a high rate of droplet ejection frequency.

In some embodiments, the method may further comprise adding a modifier to the DMS cell. In some embodiments, the modifier comprises a chemical modifier such as, for example, isopropanol, acetonitrile, ethylacetate, an adduct forming agent, and/or any polar molecule or solvent that can form one or more clusters with ions.

In some embodiments, the method may further comprise, locating a first sample well in alignment with an acoustic droplet ejector prior to ejecting droplet(s) a first sample. In some further embodiments, the method may further comprise locating a second sample well in alignment with an acoustic droplet ejector prior to ejecting droplet(s) from the second sample. In yet further embodiments, the method may comprise locating a plurality of individual sample wells in alignment with an acoustic droplet ejector prior to ejecting droplet(s) from each of the plurality of individual sample wells.

In accordance with various aspects and embodiments of the methods disclosed herein, a "droplet ejection frequency" refers to a rate at which individual sample droplets of a given volume are ejected, (e.g., by ADE). An individual sample droplet or a plurality of individual sample droplets can comprise a volume of sample that constitutes a sample ejection event. Thus, a "sample ejection event" refers to a volume of sample that is ejected (e.g., by ADE), whether as a single droplet or as multiple droplets, that is ejected from a sample reservoir into a capture fluid (e.g., capture fluid in an OPI) for sample analysis. The "sampling frequency" refers to the rate at which sample in the capture fluid is analyzed. In accordance with various embodiments of the methods disclosed herein, one or more of these parameters can be adjusted for the same sample or between different samples to provide methods for pseudo-continuous detection or discontinuous detection.

In embodiments of the method, the ejecting of the first sample is performed using a first droplet ejection frequency (i.e., a first frequency at which a droplet is ejected from the first sample), and the ejecting of the second sample is performed using a second droplet ejection frequency (i.e., a second frequency at which a droplet is ejected from the second sample). In embodiments the first droplet ejection frequency and the second droplet ejection frequency are different.

In some further embodiments, the pseudo-continuous signal of ion detection from the first sample comprises detecting ions at a first sampling frequency (or, alternatively, "sampling rate"), and the discontinuous signal of ion detection from the second sample comprises detecting ions at a second sampling frequency (or sampling rate). In either the pseudo-continuous or discontinuous detection, the sampling frequency can be determined based on the frequency of a sample ejection event, wherein a sample ejection event comprises a defined volume of ejected sample, and wherein the ejected sample volume is ejected as a single droplet or multiple droplets (i.e., multiple droplets ejected at a high rate to constitute a single sample volume/ejection event, or a single droplet ejected to constitute a single sample volume/ejection event). In embodiments, the first sampling frequency and the second sampling frequency are different. In some embodiments, the sampling frequency associated with acquiring a pseudo-continuous signal is shorter than the sampling frequency associated with acquiring a discontinuous signal (i.e., time between sampling events in discontinuous detection is longer relative to time between sampling events in pseudo-continuous detection).

In some further illustrative embodiments, a first frequency (i.e., in the pseudo-continuous mode) comprises a droplet ejection frequency and sample ejection event within a pseudo-infusion (or infusion-like) sampling frequency. Similarly, a second frequency (i.e., in the discontinuous mode) comprises a droplet ejection frequency and sample ejection event within a discontinuous sampling frequency. In some further illustrative embodiments, and depending on droplet ejection frequency, sample ejection event, and sampling frequency, the analysis may comprise a single ejected droplet or multiple ejected droplets, and can be adjusted to operate in pseudo-continuous or discontinuous mode (e.g., a first droplet ejection frequency can be 10 Hz (i.e., 10 ejected individual droplets per second for the pseudo-continuous mode), and a second droplet ejection frequency could be 1 Hz (one ejected individual droplet per second). Each ejection event can comprise, for example, a 5-drop ejection, and these 5 drops within the same ejection event can be dispensed at 400 Hz (which differs from the prior dispensing at 10 Hz or 1 Hz).

In some embodiments of the method, the SV/CoV pair may be further selected by: repeating the pseudo-continuous ejection of the first sample for a plurality of samples; and selecting the SV/CoV pair by comparing the ion intensity for each of the samples at each of the SV/CoV pairs to select the SV/CoV pair that provides selectivity between the plurality of samples.

In another aspect, the disclosure provides a system for analyzing samples, the system comprising: a mass spectrometer for detecting ions of interest; an ADE for acoustically ejecting sample droplets; an OPI for capturing ejected sample droplets, diluting the captured sample droplets, and transporting the diluted sample to an ion source of the MS for ionization; a DMS operative to apply a variable electric field to selectively transmit ions based on ion mobility through the varying electric field; wherein the ADE is operative to pseudo-continuously eject sample droplets in a pseudo-continuous mode to produce a pseudo-continuous ion signal detected by the MS while evaluating a plurality of SV/CoV pair settings of the DMS to select an SV/CoV pair to use for analysis, and wherein the ADE is further operative to discontinuously eject sample droplets in a discontinuous mode while the selected SV/CoV pair is applied to the DMS to transmit a pulse of ions to the MS for analysis.

In some embodiments the system may further comprise a plate stage for receiving a sample well plate hosting a plurality of wells, the plate stage operative to selectively locate one of the plurality of wells in alignment with the ADE to eject one or more sample droplets from the aligned well.

In some embodiments, the system is further operative to locate a first well in alignment with the ADE when operating in the pseudo-continuous mode and to locate a second well in alignment with the ADE when operating in the discontinuous mode.

In some embodiments, the system may further comprise a modifier supply, wherein the system is further operative to supply modifier from the modifier supply to the DMS. In some embodiments, the DMS may include a throttle gas or a bleed gas to adjust the residence time for ions and the resolving power.

In some embodiments, the system may be further operative to eject droplets at a first droplet ejection frequency in the pseudo-continuous mode, and eject droplets at a second droplet ejection frequency in the discontinuous mode. In such embodiments, the droplet ejection frequency can be modified or adjusted based on the rate, or frequency, of a sampling event and/or the volume of sample that is used to define a sampling event. In some embodiments, methods that comprise a plurality of ejected droplets as a single sampling event, the second droplet ejection frequency is higher than the first droplet ejection frequency (i.e., the rate at which droplets are ejected in the discontinuous mode is higher than the rate at which droplets are ejected in the pseudo-continuous mode). In some aspects, the second ejection frequency is higher than 20 Hz, higher than 50 Hz, higher than 100 Hz.

The ejecting of the volume of the second sample may comprise a relatively short burst of ejections at a second ejection frequency and an ejection pause that is associated with a sampling event, before a subsequent burst of ejections for a subsequent sample and a subsequent sampling event.

In some embodiments, the system may be further operative to mass filter ions transmitted by the DMS before detection by the MS.

In some embodiments, the system may be further operative to eject droplets at a first frequency in the pseudo-continuous mode, and eject droplets at a second frequency in the discontinuous mode.

In some embodiments, the system may be further operative to pseudo-continuously eject droplets for more than about 10 seconds in the pseudo-continuous mode.

In some embodiments, the system may be further operative to pseudo-continuously eject droplets for more than about 1 minute in the pseudo-continuous mode.

In some embodiments, the system may be further operative to eject droplets for less than about 5 seconds in the discontinuous mode and pause before ejecting a next sample.

In some embodiments, the system may be further operative to eject droplets for less than about 2 seconds in the discontinuous mode and pause before ejecting a next sample.

In some embodiments, the system may be operative to pseudo-continuously eject droplets for more than about 5 seconds or more than about 10 seconds in the pseudo-continuous mode, and, in the discontinuous mode, eject one or more droplets from each of a plurality of samples to provide a sample dilution to the MS about once every two seconds, or more frequently than once every two seconds.

In some embodiments, the DMS comprises a curved electrode FAIMS DMS device and wherein the compensation voltage comprises a compensation voltage (CV) and the separation voltage (SV) comprises a dispersion voltage (DV).

BRIEF DESCRIPTION OF THE DRAWINGS

FIG. 3A: Peaks correspond to sample volumes, in increasing increments of 5 nL, loaded into OPI from 5 nL (single drop) to 100 nL (20 drops). FIG. 3B: Peaks correspond to sample volumes, with drop size of 1 nL. Sample volumes ranging from 1-10 nL, in 1 nL increments were run in triplicate, and compared to sample volumes of 20 nL, 50 nL, and 100 nL (also each in triplicate).

DETAILED DESCRIPTION

In accordance with the example aspects and embodiments described herein, the methods and systems incorporate an AEMS comprising features and elements that include a transducer (i.e., an acoustic droplet ejector) that can be configured to allow for variation and selection of several different droplet ejection modes (e.g., that provide for different volumes of individual droplets and different rate of individual droplet ejections, among other features). These different modes can be used for dispensing multiple droplets over a period of time as a single "pseudo-continuous" sampling mode that provides for determining DMS settings that can be specific and/or selective for a particular analyte(s) of interest, and/or particular sample characteristics (e.g., sample source, matrix characteristics, etc.). In accordance with the example aspects and embodiments of the disclosure, determining a series of SV/CoV pairs (or SV/CoV relationships or ratios) for different samples and analytes of interest in a pseudo-continuous mode is surprisingly shown to eliminate the need to pre-optimize, pre-tune, and/or pre-select these DMS values prior to the installation of the OPI which provides a number of advantages to the disclosed systems and methods, relative to the state of the art. Illustrative features of the systems and methods in accordance with the disclosure are described below.

The disclosure is described in terms of planar differential mobility spectrometers, but the methods and systems are equally applicable to curved electrode FAIMS DMS devices. Accordingly, the terms compensation voltage (CoV) and separation voltage (SV) used within when describing in relation to planar DMS devices is interchangeable with the terms compensation voltage (CV) and dispersion voltage (DV) as are commonly used for curved electrode FAIMS DMS devices.

As used herein, the term "pseudo-continuous," when used with "mode" or "signal" is (or alternatively, "infusion-like") refers to a mode of operating an AEMS under conditions that provide for a detectable ion signal that is constant or substantially constant over a continuous period of time. In aspects and embodiments of the methods described herein, a pseudo-continuous signal can be generated from sample volumes repeatedly ejected by ADE into a capture probe at a rate that provides a consistent amount (e.g., consistent dilution) of detectable sample over a continuous period of signal acquisition. The pseudo-continuous mode of operation and acquisition of signal differs from a "discontinuous" mode of operating an AEMS. As used herein the term "discontinuous" when used with "mode" or "signal" refers to conditions that do not include pseudo-continuous signal detection including, for example, operating an AEMS under conditions that are typical for AEMS analysis (e.g., typical droplet volume, droplet ejection rate, typical sampling rate, typical capture fluid flow rate, typical cycles of signal detection/acquisition, etc.).

Figure 1A:
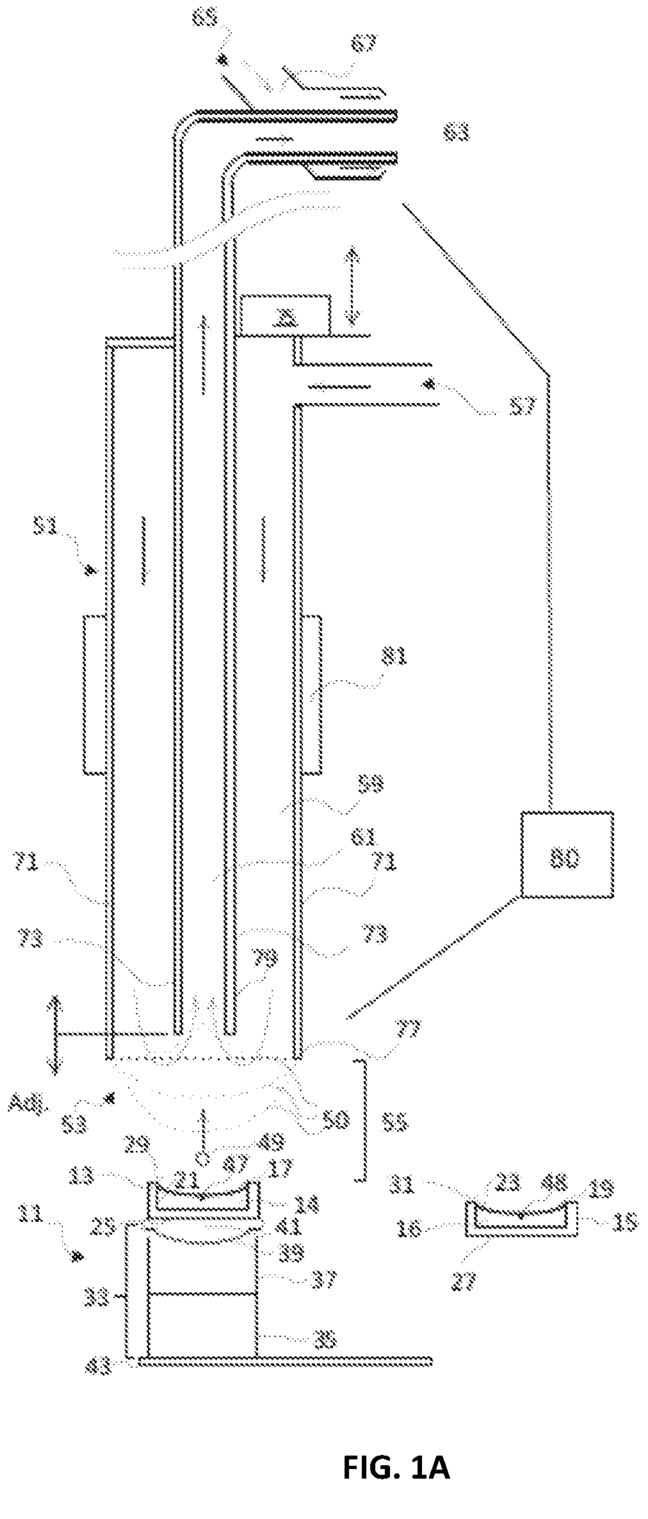
FIGS. 1A-1B illustrate an OPI sampling interface and an ADE device in accordance with some example aspects and embodiments of the disclosure.

A representative system in accordance with example aspects and embodiments of the disclosure can comprise a sampling probe and a transducer capable of ejecting sample, as illustrated in FIG. 1A. As with all figures referenced herein, in which like parts are referenced by like numerals, FIG. 1A is not to scale, and certain dimensions are exaggerated for clarity of presentation. In FIG. 1A, the transducer comprises an acoustic droplet ejection (ADE) device and is shown generally at 11, ejecting droplet 49 toward the continuous flow sampling probe (referred to herein as, an open port interface (OPI), or alternatively, as an open port sampling interface (OPSI)) indicated generally at 51 and into the sampling tip 53 thereof.

The acoustic droplet ejection device 11 includes at least one reservoir, with a first reservoir shown at 13 and an optional second reservoir 31. In some embodiments, a further plurality of reservoirs may be provided. Each reservoir is configured to house a fluid sample having a fluid surface, e.g., a first fluid sample 14 and a second fluid sample 16 having fluid surfaces respectively indicated at 17 and 19. When more than one reservoir is used, as illustrated in FIG. 1A, the reservoirs are preferably both substantially identical and substantially acoustically indistinguishable, although identical construction is not a requirement.

The ADE comprises acoustic ejector 33, which includes acoustic energy generator 35 and focusing means 37 for focusing the acoustic energy generated at a focal point 47 within the fluid sample, near the fluid surface. As shown in FIG. 1A, the focusing means 37 may comprise a single solid piece having a concave surface 39 for focusing the acoustic energy, but the focusing means may be constructed in other ways as discussed below. The acoustic ejector 33 is thus adapted to generate and focus acoustic energy so as to eject a droplet of fluid from each of the fluid surfaces 17 and 19 when acoustically coupled to reservoirs 13 and 15, and thus to fluids 14 and 16, respectively. The acoustic energy generator 35 and the focusing means 37 may function as a single unit controlled by a single controller, or they may be independently controlled, depending on the desired performance of the device.

The acoustic droplet ejector 33 may be in either direct contact or indirect contact with the external surface of each reservoir. With direct contact, in order to acoustically couple the ejector to a reservoir, it is preferred that the direct contact be wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs that have a specially formed inverse surface.

Optimally, acoustic coupling is achieved between the ejector and each of the reservoirs through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and the underside of the reservoir. In addition, it is important to ensure that the fluid medium is substantially homogeneous and stable. As shown, the first reservoir 13 is acoustically coupled to the acoustic focusing means 37 such that an acoustic wave generated by the acoustic energy generator is directed by the focusing means 37 into the acoustic coupling medium 41, which then transmits the acoustic energy into the reservoir 13.

In operation, reservoir 13 and optional reservoir 15 of the device are filled with first and second fluid samples 14 and 16, respectively, as shown in FIG. 1A. The acoustic ejector 33 is positioned just below reservoir 13, with acoustic coupling between the ejector and the reservoir provided by means of acoustic coupling medium 41. Initially, the acoustic ejector is positioned directly below sampling tip 53 of OPI 51, such that the sampling tip faces the surface 17 of the fluid sample 14 in the reservoir 13. Once the ejector 33 and reservoir 13 are in proper alignment below sampling tip 53, the acoustic energy generator 35 is activated to produce acoustic radiation that is directed by the focusing means 37 to a focal point 47 near the fluid surface 17 of the first reservoir. As a result, droplet 49 is ejected from the fluid surface 17 toward and into the liquid boundary 50 at the sampling tip 53 of the OPI 51, where it combines with solvent in the flow probe 53. The profile of the liquid boundary 50 at the sampling tip 53 may vary from extending beyond the sampling tip 53 to projecting inward into the OPI 51. In a multiple-reservoir system, the reservoir unit (not shown), e.g., a multi-well plate or tube rack, can then be repositioned relative to the acoustic ejector such that another reservoir is brought into alignment with the ejector and a droplet of the next fluid sample can be ejected. The solvent in the flow probe cycles through the probe continuously, minimizing or even eliminating "carryover" between droplet ejection events. Fluid samples 14 and 16 are samples of any fluid for which transfer to an analytical instrument is desired, where the term "fluid" is as defined earlier herein.

The structure of OPI 51 is also shown in FIG. 1A. Any number of commercially available continuous flow sampling probes can be used as is or in modified form, all of which, as is well known in the art, operate according to substantially the same principles. As can be seen in the FIG. 1A, the sampling tip 53 of OPI 51 is spaced apart from the fluid surface 17 in the reservoir 13, with a gap 55 therebetween. The gap 55 may be an air gap, or a gap of an inert gas, or it may comprise some other gaseous material; there is no liquid bridge connecting the sampling tip 53 to the fluid 14 in the reservoir 13. The OPI 51 includes a solvent inlet 57 for receiving solvent from a solvent source and a solvent transport capillary 59 for transporting the solvent flow from the solvent inlet 57 to the sampling tip 53, where the ejected droplet 49 of analyte-containing fluid sample 14 combines with the solvent to form an analyte-solvent dilution. A solvent pump (not shown) is operably connected to and in fluid communication with solvent inlet 57 in order to control the rate of solvent flow into the solvent transport capillary and thus the rate of solvent flow within the solvent transport capillary 59 as well.

Fluid flow (e.g., capture fluid/liquid) within the OPI 51 carries the analyte-capture liquid dilution through a sample transport capillary 61 provided by inner capillary tube 73 toward sample outlet 63 for subsequent transfer to an analytical instrument. In some example embodiments a capture liquid supply pump (not shown) can be provided that is operably connected to and in fluid communication with the sample transport capillary 61, to control the output rate from outlet 63. In a preferred embodiment, a positive displacement pump is used as the solvent pump, e.g., a peristaltic pump, and, instead of a sampling pump, an aspirating nebulization system is used so that the analyte-solvent dilution is drawn out of the sample outlet 63 by the Venturi effect caused by the flow of the nebulizing gas introduced from a nebulizing gas source 65 via gas inlet 67 (shown in simplified form in FIG. 1A, insofar as the features of aspirating nebulizers are well known in the art) as it flows over the outside of the sample outlet 63. The analyte-solvent dilution flow is then drawn upward through the sample transport capillary 61 by the pressure drop generated as the nebulizing gas passes over the sample outlet 63 and combines with the fluid exiting the sample transport capillary 61. A gas pressure regulator is used to control the rate of gas flow into the system via gas inlet 67. In a preferred manner, the nebulizing gas flows over the outside of the sample transport capillary 61 at or near the sample outlet 63 in a sheath flow type manner which draws the analyte-solvent dilution through the sample transport capillary 61 as it flows across the sample outlet 63 that causes aspiration at the sample outlet upon mixing with the nebulizer gas.

The capture liquid transport capillary 59 and sample transport capillary 61 are provided by outer capillary tube 71 and inner capillary tube 73 substantially co-axially disposed therein, where the inner capillary tube 73 defines the sample transport capillary, and the annular space between the inner capillary tube 73 and outer capillary tube 71 defines the solvent transport capillary 59.

The system can also include an adjuster 75 coupled to the outer capillary tube 71 and the inner capillary tube 73. The adjuster 75 can be adapted for moving the outer capillary tube tip 77 and the inner capillary tube tip 79 longitudinally relative to one another. The adjuster 75 can be any device capable of moving the outer capillary tube 71 relative to the inner capillary tube 73. Exemplary adjusters 75 can be motors including, but are not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the probe 51, and the inner and outer capillary tubes 73, 71 can be arranged coaxially around a longitudinal axis of the probe 51, as shown in FIG. 1.

Additionally, as illustrated in FIG. 1A, the OPI 51 may be generally affixed within an approximately cylindrical holder 81, for stability and ease of handling.

Figure 1B:
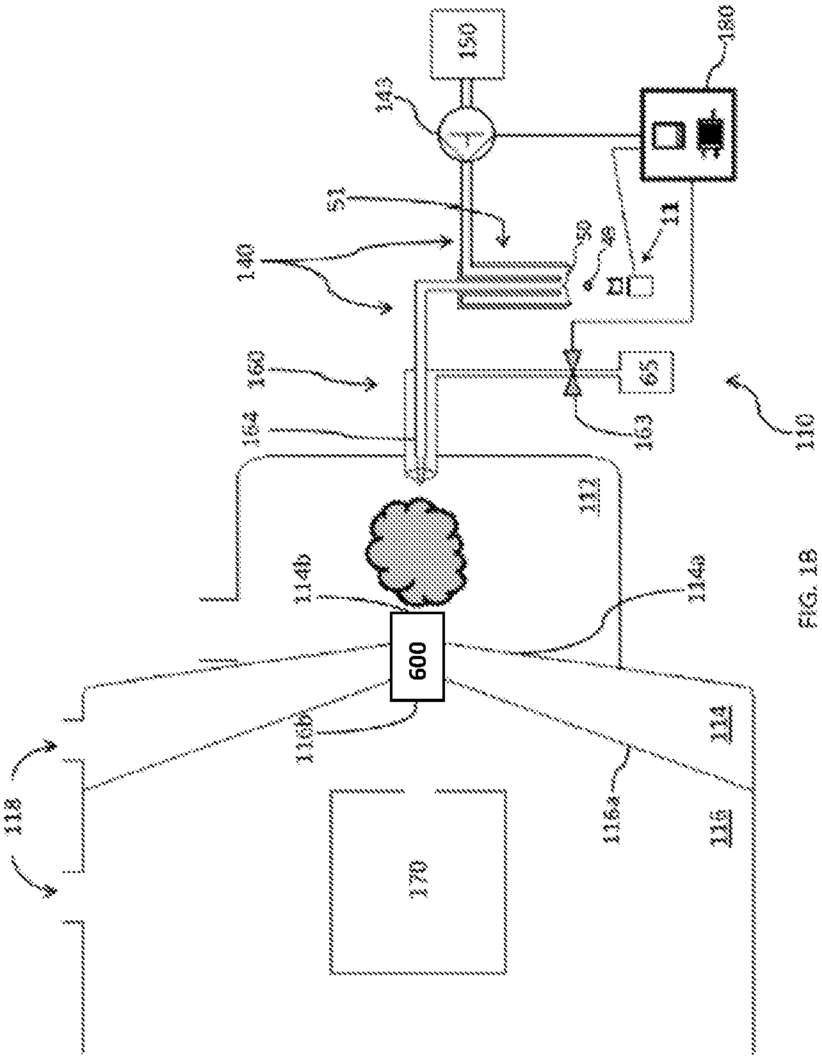

FIG. 1B schematically depicts an embodiment of an exemplary system 110 in accordance with various aspects of the disclosure for ionizing and mass analyzing analytes received within an open end of a sampling probe 51, the system 110 including an acoustic droplet injection device 11 configured to inject a droplet 49, from a reservoir into the open end of the sampling probe 51. As shown in FIG. 1B, the exemplary system 110 generally includes a sampling probe 51 (e.g., an open port probe or interface) in fluid communication with a nebulizer-assisted ion source 160 for discharging a liquid containing one or more sample analytes (e.g., via electrospray electrode 164) into an ionization chamber 112, which ions are carried or flow to a DMS unit 600, (note, not to scale) {not to scale . . . goes from source into vacuum} and a mass analyzer 170 that are in fluid communication (e.g., gas phase) with the ionization chamber 112 for downstream processing and/or detection of ions generated by the ion source 160. A fluid handling system 140 (e.g., including one or more pumps 143 and one or more conduits) provides for the flow of liquid from a liquid reservoir 150 to the sampling probe 51 and from the sampling probe 51 to the ion source 160. For example, as shown in FIG. 1B, the capture liquid reservoir 150 (e.g., containing a liquid, such as a carrier, solvent, or other liquid suitable for capturing sample and transporting to the ion source 160 for ionization) can be fluidly coupled to the sampling probe 51 via a supply conduit through which the liquid can be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, flow of liquid into and out of the sampling probe 51 occurs within a sample space accessible at the open end such that one or more droplets can be introduced into the liquid boundary 50 at the sample tip 53 (as depicted in FIG. 1A) and subsequently delivered to the ion source 160. As shown, the system 110 includes an acoustic droplet ejection device 11 that is configured to generate acoustic energy that is applied to a liquid contained within a reservoir (as depicted in FIG. 1A) that causes one or more droplets 49 to be ejected from the reservoir into the open end of the sampling probe 51. A controller 180 can be operatively coupled to the acoustic droplet ejection device 11 and can be configured to operate any aspect of the acoustic droplet ejection device 11 (e.g., focusing means, droplet ejection frequency, acoustic radiation generator, automation means for positioning one or more reservoirs into alignment with the acoustic radiation generator, etc.) so as to eject sample droplets into the sampling probe 51 or in accordance with example aspects and embodiments discussed herein substantially continuously or for selected portions of an experimental protocol, by way of non-limiting example.

As shown in the example embodiment of FIG. 1B, the exemplary ion source 160 can include a source 65 of pressurized gas (e.g. nitrogen, air, or a noble gas) that supplies a high velocity nebulizing gas flow which surrounds the outlet end of the electrospray electrode 164 and interacts with the fluid discharged therefrom to enhance the formation of the sample plume and the ion release within the plume for sampling by 114*b* and 116*b*, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min or greater, which can also be controlled under the influence of controller 180 (e.g., via opening and/or closing valve 163). In accordance with various aspects of the disclosure, it will be appreciated that the flow rate of the nebulizer gas can be adjusted (e.g., under the influence of controller 180) such that the flow rate of liquid within the sampling probe 51 can be adjusted based, for example, on suction/aspiration force generated by the interaction of the nebulizer gas and the analyte-capture liquid dilution as it is being discharged from the electrospray electrode 164 (e.g., due to the Venturi effect).

In the depicted embodiment, the ionization chamber 112 can be maintained at an atmospheric pressure, though in some embodiments, the ionization chamber 112 can be evacuated to a pressure lower than atmospheric pressure or pressurized to a pressure greater than atmospheric pressure. The ionization chamber 112, within which the analyte can be ionized as the analyte-capture liquid dilution is discharged from the electrospray electrode 164, is separated from a gas curtain chamber 114 by a plate 114*a* having a curtain plate aperture 114*b*. As shown, the system comprises a vacuum chamber 116, which houses the mass analyzer 170, and an differential mobility spectrometer system 600 (e.g., a DMS, discussed below) that is disposed between the ionization chamber 112 and the mass analyzer 170 and is configured to separate ions based on their mobility through a drift gas in high- and low-fields rather than their mass-to-charge ratio). The vacuum chamber 116 may be separated from the curtain chamber 114 and DMS by a plate 116*a* having a vacuum chamber sampling orifice 116*b*. The curtain chamber 114 and DMS, and the vacuum chamber 116 can be maintained at a selected pressure(s) (e.g., typically with DMS maintained at atmospheric pressure) where sub-atmospheric pressure in the vacuum chamber can be achieved using one or more vacuum pump ports 118.

It will also be appreciated by a person skilled in the art and in light of the teachings herein that the mass analyzer 170 can have a variety of configurations. Generally, the mass analyzer 170 is configured to process (e.g., filter, sort, dissociate, detect, etc.) sample ions generated by the ion source 160 and optionally filtered by the DMS 600. By way of non-limiting example, the mass analyzer 170 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17:1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance other suitable mass spectrometers include single quadrupole, triple quadrupole, ToF, trap, and hybrid analyzers. It will further be appreciated that any number of additional elements can be included in the system 110 including, for example, additional ion traps and filters. Additionally, it will be appreciated that the mass analyzer 170 can comprise a detector that can detect the ions which pass through the analyzer 170 and can, for example, supply a signal indicative of the number of ions per second that are detected. It will be apparent to those of skill in the relevant arts that mass analyzer 170 may additionally include multiple differentially pump vacuum stages with ion guides and lenses (not shown).

Differential mobility spectrometry (DMS), which may also be referred to as Field Asymmetric Waveform Ion Mobility Spectrometry (FAIMS) or Field Ion Spectrometry (FIS), typically performs gas-phase ion sample separation and analysis by continuously transmitting ions-of-interest while filtering out unwanted/non-selected species. In accordance with the example aspects and embodiments of the disclosure, a DMS can be interfaced with a mass spectrometer (MS (e.g., an AEMS)) to take advantage of the atmospheric pressure, gas-phase, and continuous ion separation capabilities of the DMS and the detection accuracy of the MS. The combination of a DMS with an MS has enhanced numerous areas of complex sample analysis, including proteomics, peptide/protein conformation, pharmacokinetics, and metabolic processes. In addition to pharmaceutical and biotech applications, DMS-based analyzers have been used for trace level explosives detection and petroleum monitoring.

A DMS separates and analyzes ions based on the mobility characteristics of the ions rather than based on the mass-to-charge ratio as in MS. Specifically in DMS, ions within a drift gas can be continuously sampled, between two parallel electrodes that generate an asymmetric electric field (S or separation field) therebetween that tends to move the ions in a direction perpendicular to the direction of the drift gas flow (i.e., toward the electrodes). The asymmetric field(S) can be generated by applying an electrical signal(s) (e.g., RF voltages) to one or more of the electrodes so as to generate an asymmetric waveform, the amplitude of which is referred to as the SV (separation voltage). Typically, the asymmetric field S exhibits a high field duration at one polarity and then a low field duration at an opposite polarity, with the durations of the high field and low field portions set such that the net electrical force on the ions in a direction perpendicular to the direction of the gas flow (i.e., in the direction of the electrodes) over each period is zero during each cycle of the SV. Because the mobility of a particular ion through the drift gas during the high and low field portions of the SV can be a function of each particular ion's size, shape, and charge state (and its interactions with the background gas), the flight paths of various ions through the DMS can deviate from the center of the chamber toward the electrodes as the ions drift therebetween, unless the trajectories of the ions are corrected by a counterbalancing force. In DMS, this counterbalancing force is typically provided by a DC compensation field (C), in which a DC voltage difference between the electrodes (CoV or CV) can restore a stable trajectory for a subset of the ions, thereby allowing these ions to be transmitted from the DMS. In this manner, the CoV can be set to a fixed value corresponding to the optimum transmission for an ion of interest (e.g., based on theoretical calculations or empirical data) such that the ions of interest and other ion species exhibiting a stable trajectory within the differential mobility field (e.g., the field at that SV/CoV combination) are transmitted by the DMS, while non-selected or non-desired/unstable ions are neutralized at the electrodes.

Because conventional DMS methods and devices only enable a single SV/CoV combination to be applied at a given time, known DMS techniques can require more sample runs (e.g., sample injections) to be performed in order to apply the various SV/CoV pairs, thereby reducing sample throughput and/or increasing sample consumption. Though conventional DMS devices can alternatively be operated by varying the SV and/or CoV over time so as to iteratively transmit ions of different mobilities during a single sample run, such methods can nonetheless result in increased sample consumption, as well as duty cycle loss and/or increased data acquisition times due to the time required to switch the CoV value and refill the front end optics of the mass spectrometer (typically on the order of about 15 ms). Conventional DMS devices could alternatively be operated at sub-optimal conditions so as to ensure transmission of ion species having different characteristic mobilities. By way of example, conventional DMS devices could be operated at a SV/CoV pair such that each of two ions of interest are transmitted, with neither being at its theoretical or empirical optimum CoV apex corresponding to its maximum transmission. Alternatively, the residence time of the ions within the DMS can be decreased (e.g., by increasing the rate of the drift gas) such that more ions exhibit a stable trajectory at each SV/CoV pair due to the decreased residence time in the asymmetric field. Such sub-optimal methods, however, can result in decreased sensitivity, decreased resolution, and/or the increased transmission of undesired ions.

Figure 2:
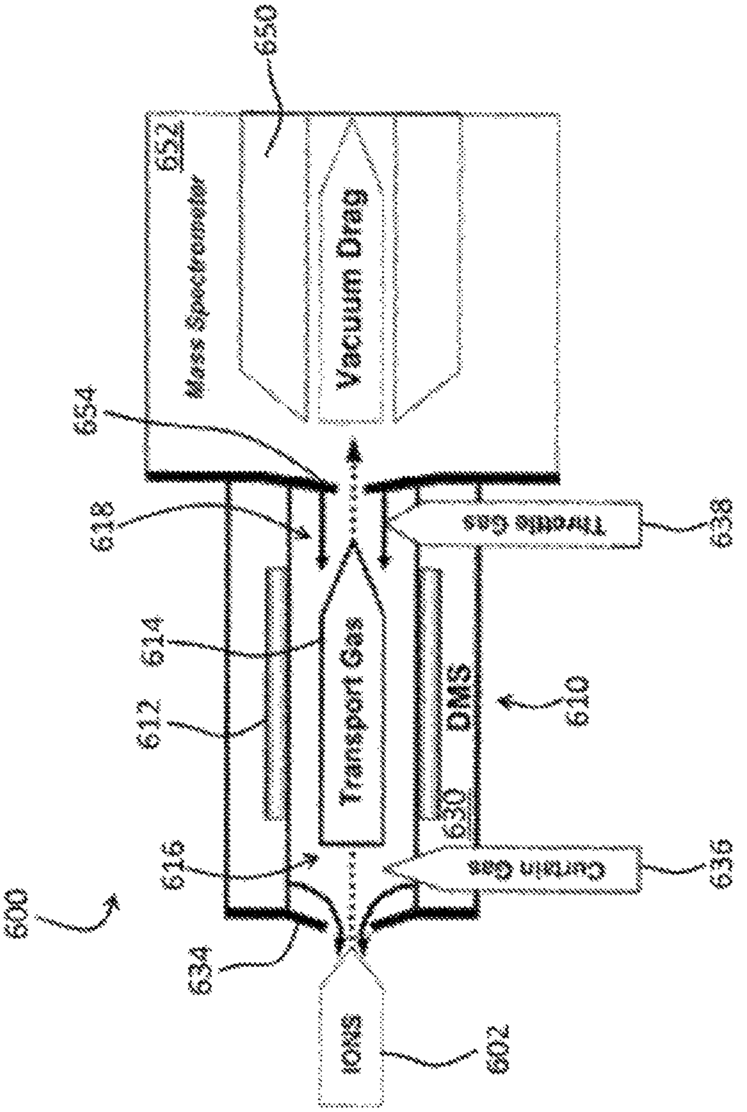
FIG. 2 illustrates a general arrangement of a differential mobility spectrometer interface to a mass spectrometer in accordance with example aspects and embodiments of the disclosure.

Referring to FIG. 2, and in accordance with an example embodiment of the disclosure, a DMS system assembly 600 is generally depicted. As will be appreciated by a person skilled in the art, however, the exemplary system 600 represents only one possible configuration for use in accordance with various aspects of the systems, devices, and methods described herein.

As shown in FIG. 2, the exemplary system assembly 600 generally comprises a differential mobility device (i.e., DMS) 610 in fluid communication with a first vacuum lens element 650 of a mass spectrometer (hereinafter generally designated mass spectrometer 650). The differential mobility device 610 can have a variety of configurations that are generally known and described in the art (see, e.g., U.S. Pat. No. 8,084,736, US2019/0113478 and US2019/0086363 all of which are incorporated herein by reference). Generally a DMS is configured to resolve ions 602 (e.g., ionized isobaric species) based on their mobility through a fixed or variable electric field. It will be appreciated that though the ion mobility device 610 is commonly described herein as a differential mobility spectrometer or DMS, the ion mobility device can be any ion mobility device configured to separate ions based on their mobility through a carrier or drift gas, including by way of non-limiting example, an ion mobility spectrometer, a drift-time ion mobility spectrometer, a traveling-wave ion mobility spectrometer, a differential mobility spectrometer, and a high-field asymmetric waveform ion mobility spectrometer (FAIMS) of various geometries such as parallel plate, curved electrode, spherical electrode, micromachined FAIMS, or cylindrical FAIMS device, among others. As noted above, the CoV, when applied to the DMS cell, provides a counterbalancing electrostatic force to that of the SV. The CoV can be tuned so as to preferentially prevent the drift of a species of ion of interest. Depending on the application, the CoV can be set to a fixed value to pass only ion species with a particular differential mobility while the remaining species of ions drift toward the electrodes and are neutralized. Alternatively, if the CoV is scanned for a fixed SV as a sample is introduced continuously into the DMS, a mobility spectrum can be produced as the DMS transmits ions of different differential mobilities.

In the example embodiment depicted in FIG. 2, the DMS 610 is contained within a curtain chamber 630 that is defined by a curtain plate or boundary member 634 and is supplied with a curtain gas 636 from a curtain gas supply (not shown). As shown, the exemplary DMS 610 comprises a pair of opposed electrode plates 612 that surround a transport gas 614 that drifts from an inlet 616 of the DMS 610 to an outlet 618 of the DMS 610. The outlet 618 of the DMS 610 releases the drift gas 616 into an inlet 654 of a vacuum chamber 652 containing the mass spectrometer 650. A throttle gas 638 can additionally be supplied at the outlet 618 of the DMS 610 so as to modify the flow rate of transport gas 614 through the DMS 610. Although not shown here, the region between the DMS and vacuum inlet may include additional structure such as a throttle gas chamber as known in the prior art.

In accordance with certain embodiments of the disclosure, the curtain gas 636 and throttle gas 638 can be set to flow rates determined by a flow controller and valves, where flow of the throttle gas may alter the drift time of ions within the DMS 610. Each of the curtain and throttle gas supplies can provide the same or different pure or mixed composition gas to the curtain gas chamber. By way of non-limiting example, the curtain gas can be air, $O_2$, He, $N_2$, or $CO_2$. The pressure of the curtain chamber 630 can be maintained, for example, at or near atmospheric pressure (i.e., 760 Torr). Additionally, the system 600 can include a chemical modifier supply (not shown) for supplying a chemical modifier and/or reagent (hereinafter referred as chemical modifier) to the curtain and throttle gases. As will be appreciated by a person skilled in the art, the modifier supply can be a reservoir of a solid, liquid, or gas through which the curtain gas is delivered to the curtain chamber 630. By way of example, the curtain gas can be bubbled through a liquid modifier supply. Alternatively, a modifier liquid or gas can be metered into the curtain gas, for example, using an LC pump, syringe pump, or other dispensing device for dispensing the modifier into the curtain gas at a known rate. For example, the modifier can be introduced using a pump so as to provide a selected concentration of the modifier in the curtain gas. The modifier supply can provide any modifier known in the art including, by way of non-limiting example, water, volatile liquid (e.g., methanol, propanol, acetonitrile, ethanol, acetone, and benzene), including alcohols, alkanes, alkenes, halogenated alkanes and alkenes, furans, esters, ethers, aromatic compounds. As will be appreciated by a person skilled in the art in light of the present teachings, the chemical modifier can interact with the ionized analytes such that the ions differentially interact with the modifier (e.g., cluster via hydrogen or ionic bonding) during the high and low field portions of the SV, thereby effecting the CoV needed to counterbalance a given SV. In some cases, this can increase the separation between the ionized analytes. To facilitate clustering, the chemical modifier may comprise a polar species.

Ions 602 (e.g., ionized isobaric species) can be generated by an ion source (not shown) and emitted into the curtain chamber 630 via curtain chamber inlet 634. As will be appreciated by a person skilled in the art, the ion source can be virtually any ion source known in the art, including for example, an electrospray ionization (ESI) source. The pressure of the curtain gases in the curtain chamber 630 (e.g., ~760 Torr) can provide both a curtain gas outflow out of curtain gas chamber inlet, as well as a curtain gas inflow into the DMS 610, which inflow becomes the transport gas 614 that carries the ions 602 through the DMS 610 and into the mass spectrometer 650 contained within the vacuum chamber 652, which can be maintained at a much lower pressure than the curtain chamber 630. By way of non-limiting example, the vacuum chamber 652 can be maintained at a pressure lower than that of the curtain chamber 630 (e.g., by a vacuum pump) so as to drag the transport gas 614 and ions 602 entrained therein into the inlet 654 of the mass spectrometer 650.

As will be appreciated by a person skilled in the art, the differential mobility/mass spectrometer system 600 can additionally include one or more additional mass analyzer elements downstream from vacuum chamber 652. Ions 602 can be transported through vacuum chamber 652 and through one or more additional differentially pumped vacuum stages containing one or more mass analyzer elements. For instance, in one embodiment, a triple quadrupole mass spectrometer may comprise three differentially pumped vacuum stages, including a first stage maintained at a pressure of approximately 2.3 Torr, a second stage maintained at a pressure of approximately 6 mTorr, and a third stage maintained at a pressure of approximately 10-5 Torr. The third vacuum stage can contain a detector, as well as two quadrupole mass analyzers with a collision cell located between them. It will be apparent to those skilled in the art that there may be a number of other ion optical elements in the system. Alternatively, a detector (e.g., a Faraday cup or other ion current measuring device) effective to detect the ions transmitted by the DMS 610 can be disposed directly at the outlet of the DMS 610. It will be apparent to those skilled in the art that the mass spectrometer employed could take the form of a quadrupole mass spectrometer, triple quadrupole mass spectrometer, time-of-flight mass spectrometer, FT-ICR mass spectrometer, or Orbitrap mass spectrometer, all by way of non-limiting example.

In an aspect, the disclosure provides a method for operating an AEMS with a DMS for ion selection, wherein the method comprises ejecting a first sample into an OPI to provide a pseudo-continuous signal of ion detection at the MS; evaluating ion detection intensity for a plurality of SV/CoV pair settings of the DMS; and, selecting an SV/CoV pair to use for analysis.

In some embodiments of the method, the evaluating ion detection intensity for a plurality of SV/CoV pair settings of the DMS comprises ramping the CoV over a plurality of values for at least one SV. In some further embodiments, the method may further comprise ramping CoV over a plurality of values for each of a plurality of SV values. In some embodiments, the method comprises varying both SV and CoV over a series of ejections that provide a pseudo-continuous signal of ion detection at the MS.

In some embodiments of the method, the ejecting to provide a pseudo-continuous signal comprises ejecting for at least a continuous 10 seconds and up to about 5 minutes. In some further embodiments, the ejecting to provide a pseudo-continuous signal may comprise ejecting for at least a continuous 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or about 300 seconds or more. In some embodiments, the total available sample volume may determine or limit certain aspects and features of the ejection, including, for example, the droplet volume, frequency of the ejection, and duration of the pseudo-continuous ejection.

In some embodiments of the method the ejecting comprises ejecting for less than a continuous 5 seconds (e.g., less than 5, 4, 3, 2, or 1 second). In such embodiments, the method can comprise ejecting sample to provide a discontinuous signal, optionally at one or more SV/CoV pairs determined from the plurality of SV/CoV pair settings during the pseudo-continuous signal detection. In some further embodiments, the ejecting may comprise less than a continuous 2 seconds. In some further embodiments, the ejecting to provide a discontinuous signal comprises ejecting for less than a continuous 2 seconds, pausing for a set period of time, (e.g., at least about 0.2 seconds), and ejecting a next sample for less than a continuous 2 seconds. In some embodiments of the method the ejecting to provide a discontinuous signal comprises ejecting a sample volume of less than about 300 nL, pausing for at least 0.2 seconds, and ejecting a sample volume of less than about 300 nL from a next sample. In some embodiments, the method comprises ejecting the sample volume as a single sample droplet. In some embodiments, the method comprises ejecting the sample volume as a plurality of sample droplets. In some embodiments the method comprises a plurality of samples.

In some embodiments of the method, the transducer (e.g., ADE) can be configured to operate within a wide range of adjustable droplet ejection frequencies. While the upper and lower limits of droplet ejection frequency may be system dependent, typical transducers are able to achieve ejection frequencies on the order of hundreds per second (Hz) within the fast/high frequency range, and under a hundred Hz (e.g., 5-50, 60, 70, 80, or 90 Hz) within the slow/lower frequency range. As discussed herein, the SV and CoV settings can be varied during the pseudo-continuous signal acquisition. In accordance with some example embodiments, the method can comprise ejection frequency at 5, 10, 15, 20, 25, 30, 35, 40, 45, 50, 55, 60, 65, 70, 75, 80, 85, 90, 95, or 100 or more Hz, which can be configured with the sampling interface to provide a pseudo-continuous signal of ion detection at a mass spectrometer.

In some embodiments in accordance with the method, the ejector can be configured to operate at a fast/high ejection frequency of 100, 125, 150, 175, 200, 225, 250, 275, 300, 325, 350, 375, 400, 425, 450, 475, 500, 525, 550, 575, 600, 625, 650, 675, 700, 725, 750, 775, or about 800 Hz (i.e., droplets ejected per second) or more.

In accordance with embodiments of the disclosure, the method may further comprise ejecting a second sample into the open port interface to provide a discontinuous signal of ion detection at the MS; applying the selected SV/CoV pair to the DMS; and analyzing second sample ions detected by the MS.

In some embodiments of the method, the SV/CoV pair may be further selected by repeating the ejection of the first sample for a plurality of samples; and selecting the SV/CoV pair by comparing the ion intensity for each of the samples at each of the SV/CoV pairs to select the SV/CoV pair that provides selectivity, which may differ from an SV/CoV pair that provides maximum sensitivity, between the plurality of samples. In some embodiments, the first sample comprises a reference standard. In some embodiments, the second (or plurality of samples) sample comprises an analysis sample for evaluation. In some further embodiments, the first sample and the second sample (or plurality of samples) comprise an analysis sample for evaluation.

Typically, CoV values used to transmit specific compounds through the DMS device depend on the source temperature and solvent flow rate, which in turn can vary from a typical continuous mode of operation to the OPI mode of operation (i.e., discontinuous or pseudo-continuous). Determining specific CoV values in a pseudo-continuous mode eliminates any need to pre-optimize these values before the installation of the OPI, and avoids the need for substantial alterations to system hardware.

In accordance with some embodiments of the disclosure, the method may further comprise setting a mass filter operation on the MS to permit passage of ions of interest and exclude ions of a different mass from detection.

In accordance with some embodiments of the disclosure, the method may further comprise adding a modifier to the DMS cell. In some embodiments, the modifier comprises a chemical modifier such as, for example, an agent forming cluster with ions.

In accordance with the aspects and embodiments described above, some particular embodiments of the method may further comprise, locating a first sample well in alignment with an acoustic droplet ejector prior to ejecting a first sample. In some further embodiments, the method may further comprise locating a second sample well (or a plurality of sample wells) in alignment with an acoustic droplet ejector prior to ejecting the second sample (or the plurality of samples). In such embodiments, the ejecting of the first sample is performed using a first droplet ejection frequency, and the ejecting of the second sample (or plurality of samples) is performed using a second (or plurality of) droplet ejection frequency. In some further embodiments, the ejecting of the first sample is performed using a first droplet ejection frequency, and the ejecting of the second sample (or plurality of samples) is performed using a second droplet ejection frequency (or a plurality of droplet ejection frequencies).

In another aspect, the disclosure provides a system for analyzing samples, the system comprising: a mass spectrometer MS for detecting ion of interest; an ADE for acoustically ejecting sample droplets; an OPI for capturing ejected sample droplets, diluting the captured sample, and transporting the sample dilution to an ion source of the MS for ionization; and a DMS operative to apply a varying electric field to selectively transmit ions based on ion mobility through the varying electric field. In embodiments, the DMS is configured to vary a plurality of SV/CoV pair settings during ion signal acquisition to evaluate and select an SV/CoV pair to use for analysis. In some embodiments, the ADE is operative in a pseudo-continuous mode to repeatedly eject sample droplets in volumes sufficient to produce a consistent sample dilution at the ion source of the MS to produce a pseudo-continuous signal of ion detection; and, in such embodiments, the ADE is further operative in a discontinuous mode to eject sample volumes to provide a discontinuous sample dilution at the ion source of the MS to produce a discontinuous signal of ion detection while the selected SV/CoV pair is applied to the DMS to transmit a pulse of ions to the MS for analysis.

In some embodiments the system may further comprise a plate stage for receiving a sample well plate comprising a plurality of wells, the plate stage operative to selectively locate (e.g., movable/addressable on X/Y axes) one of the plurality of wells in alignment with the ADE to eject one or more sample droplets from the aligned well. In further embodiments, the system is further operative to locate a first well in alignment with the ADE when operating in the continuous mode and to locate a second well in alignment with the ADE when operating in the discontinuous mode.

In some embodiments, the system may be further operative, in a pseudo-continuous mode, to eject droplets for more than about 10 seconds (i.e., from 10, 20, 30, 40, 50, more seconds to about 1, 2, 3, 4, or 5 minutes) to provide a pseudo-continuous signal, in accordance with the methods as described herein. In some other embodiments, and in accordance with the disclosed methods the system may be further operative, in a discontinuous mode, to eject droplets for less than about 5 seconds (i.e., less than, 4, 3, 2, or 1 seconds) to provide a discontinuous signal, and may comprise a delay or pause before ejecting droplets from any subsequent sample.

In some embodiments, the system may be further operative, in discontinuous mode, to eject droplets for less than about 2 seconds to provide a discontinuous signal, and pause before ejecting a next sample.

In some embodiments, the system may be operative, in pseudo-continuous mode, to repeatedly eject droplets for more than about 5 seconds or more than about 10 seconds to provide pseudo-continuous signal.

In accordance with the aspects and embodiments described above, the methods and systems can provide for configurational/operational settings (e.g., liquid flow rate, source temperature, source gas/electrical settings) that are consistent between the pseudo-continuous mode of operation and the pulsed mode of operation, thus providing for a series of DMS parameters that are optimized over the entirety of the AEMS analysis.

In some embodiments, the system may further comprise a DMS having a modifier supply that is operative to supply one of more modifier agents from the modifier supply to the DMS. In some embodiments, the system may be further operative to mass filter ions transmitted by the DMS before detection by the MS.

The above aspects and embodiments of the disclosure are further described by the following Examples, which are merely illustrative of particular example embodiments of the methods and systems described above, and should not be considered as limiting to the scope of the disclosure or the appended claims.

Example 1: Variable Sample Ejection Frequency Rate and Sample Delivery in AEMS

Examples 1A and 1B illustrate a series of experiments that demonstrates the variable effects the ejection rate frequency can have on sample signal in an AEMS system.

Example 1A. High Frequency

Figure 3A:
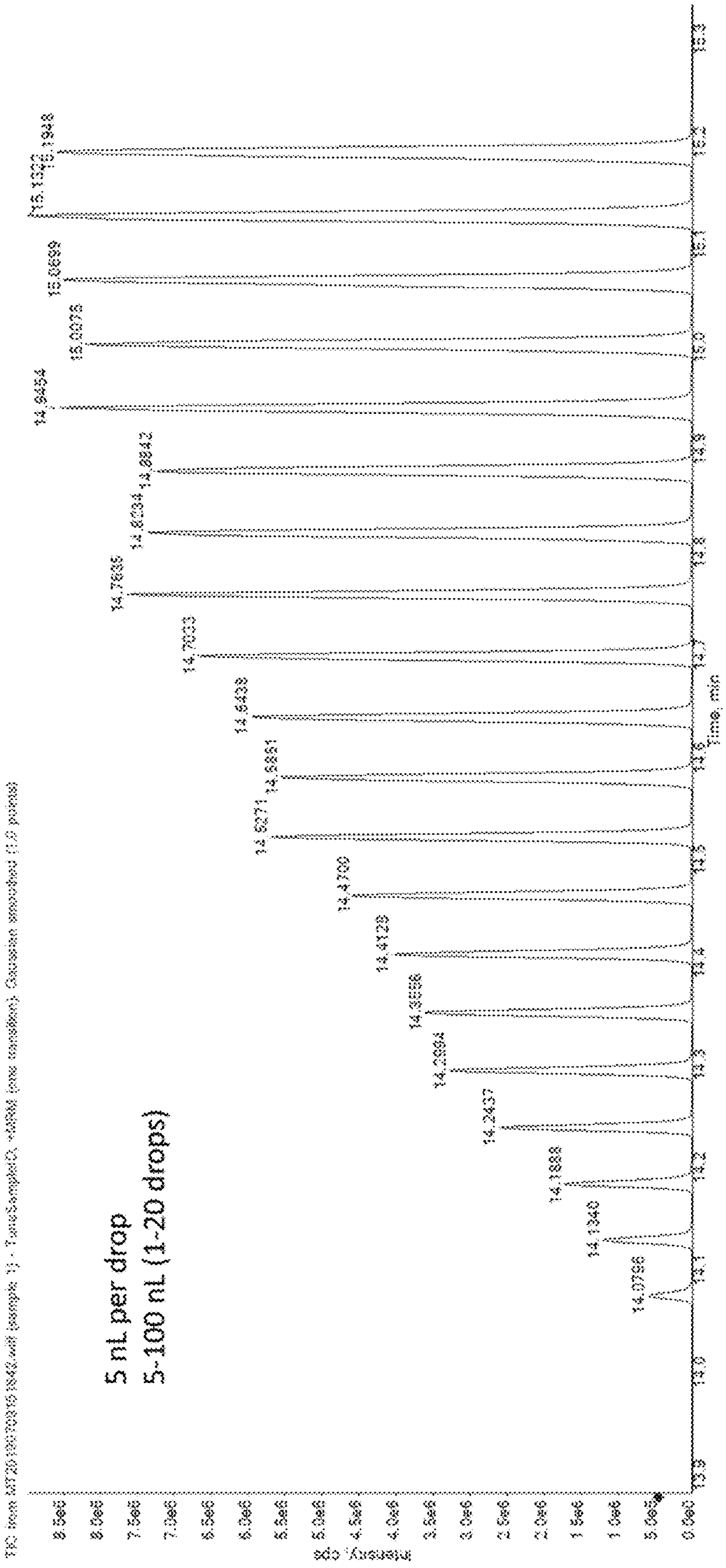
FIGS. 3A-3B. Dispensing multiple droplets at high frequency to adjust the sample loading volume within a single sample ejection event.
Figure 3B:
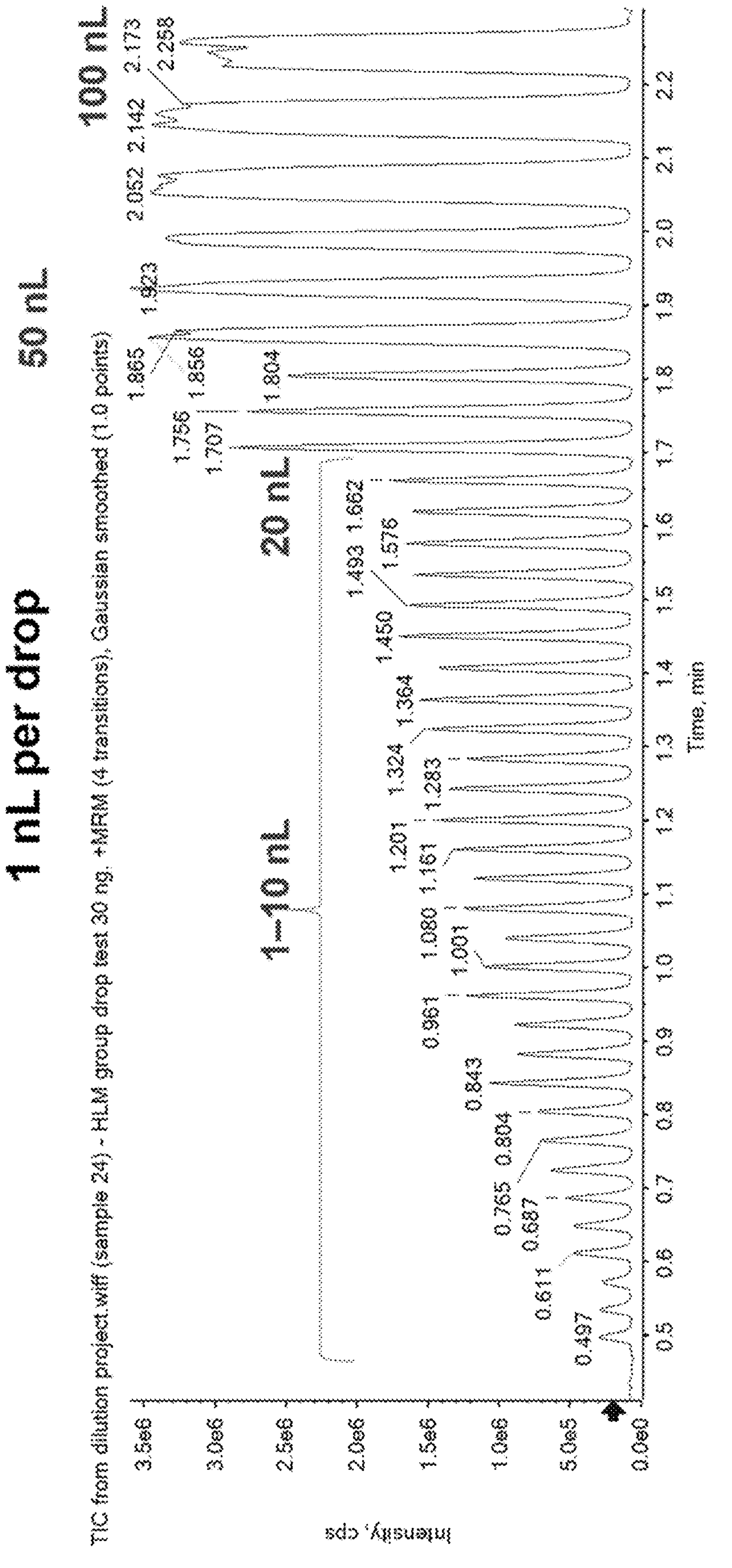

This series of experiments demonstrates that high frequency droplet ejection rates (i.e., a rate of about 100 Hz or more) can be used to increase the total amount of sample delivered to an OPI as a single observed ejection event and a short sample signal (e.g., observable as a distinct peak). In initial experiments an acoustic droplet ejector ejects a series of drops (e.g., 5 nL drops) at or near the fastest allowed ejection frequency in order to make the sample signal observable as one or more resolvable, sharp peaks and can increase the potential sensitivity and analytical throughput. As shown in FIG. 3A, a series of peaks are generated that correspond to different sample volumes loaded into an OPI ranging from 5 nL (single drop) to 100 nL (20 drops), varying in increments of 5 nL. Due to the limited volume within the open port, the maximum sample loading volume did not exceed 200-300 nL, and the required sample loading time was typically much shorter than 2 sec. FIG. 3B depicts a series of peaks that correspond to different sample volumes that are ejected as 1 nL drops at high droplet ejection frequency. Sample volumes ranging from 1-10 nL, in 1 nL increments were run in triplicate, and compared to sample volumes of 20 nL, 50 nL, and 100 nL (also each in triplicate).

Example 1B. Low Frequency

Figure 4:
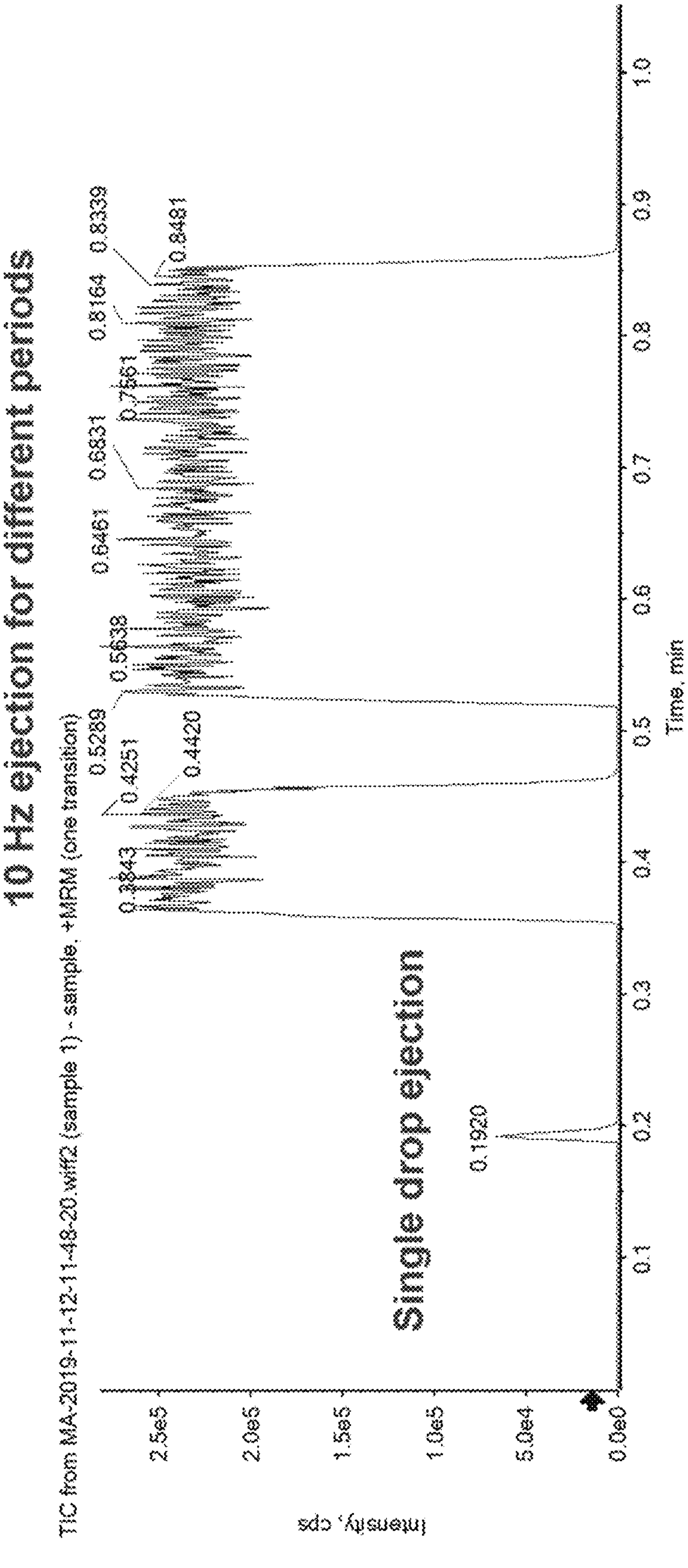
FIG. 4 illustrates three different sampling events: a peak resulting from a discontinuous signal, and two infusion-like (e.g., pseudo-continuous) signal windows with different ejection periods.

This series of experiments, depicted in FIG. 4, demonstrates that lower frequency droplet ejection rates (i.e., under 100 Hz, 5-50 Hz, etc.) can be used to achieve an observable sample signal profile that is similar to or effectively the same as observed for a continuous or an infusion sample delivery mode. Thus, when operating in a low droplet ejection frequency mode, AEMS can achieve infusion-like, pseudo-continuous sample delivery, for example, to an OPI over a period of time. In initial experiments an acoustic droplet ejector ejects a series of drops (e.g., 2.5 nL drops) at a frequency lower than the frequency used to obtain the data in Example 1A and FIGS. 3A-B. The lower frequency of droplet ejection generates a flat and stable pseudo-continuous signal much like the type of signal that is obtained by infusion-based sample delivery. The pseudo-continuous signal can be used in various MS acquisition techniques that require a stable signal over a longer time period/window (e.g., method tuning, signal averaging, narrow-MS1-window SWATH, a large number of MRM, etc.). Under typical ejection conditions, a single ejection event in an AEMS system generally results in a peak width ranging from 300 msec to 2 sec wide peak at baseline. Thus, performing a series of ejection events at a lower frequency than used in typical operation does not generate resolved signal peaks but a stable infusion-like signal over a larger time period as shown in FIG. 4, for ejection of multiple droplets at a frequency of 10 Hz.

This example demonstrates that as long as there is adequate detection sensitivity, the typical frequency used does not need to be in ranges as high as hundreds of Hz. In some applications addition of excess volumes of sample matrix can cause ionization suppression as well as have the potential to change and effect the fluid dynamics within the AEMS system (e.g., dispensing a 2.5 nL size drop at 400 Hz, adds an additional 60 μL/min effective volume to the AEMS system which may give rise to such effects). This illustrative example demonstrates the validity of the pseudo-continuous delivery method at lower frequencies (e.g., of less than 100 Hz, 5-50 Hz range etc.); however in some particular circumstances, the method may incorporate dispensing frequencies near or at the maximum dispensing frequency (e.g., low viscosity samples, and AEMS systems comprising wide operational flowrate ranges).

Figure 5:
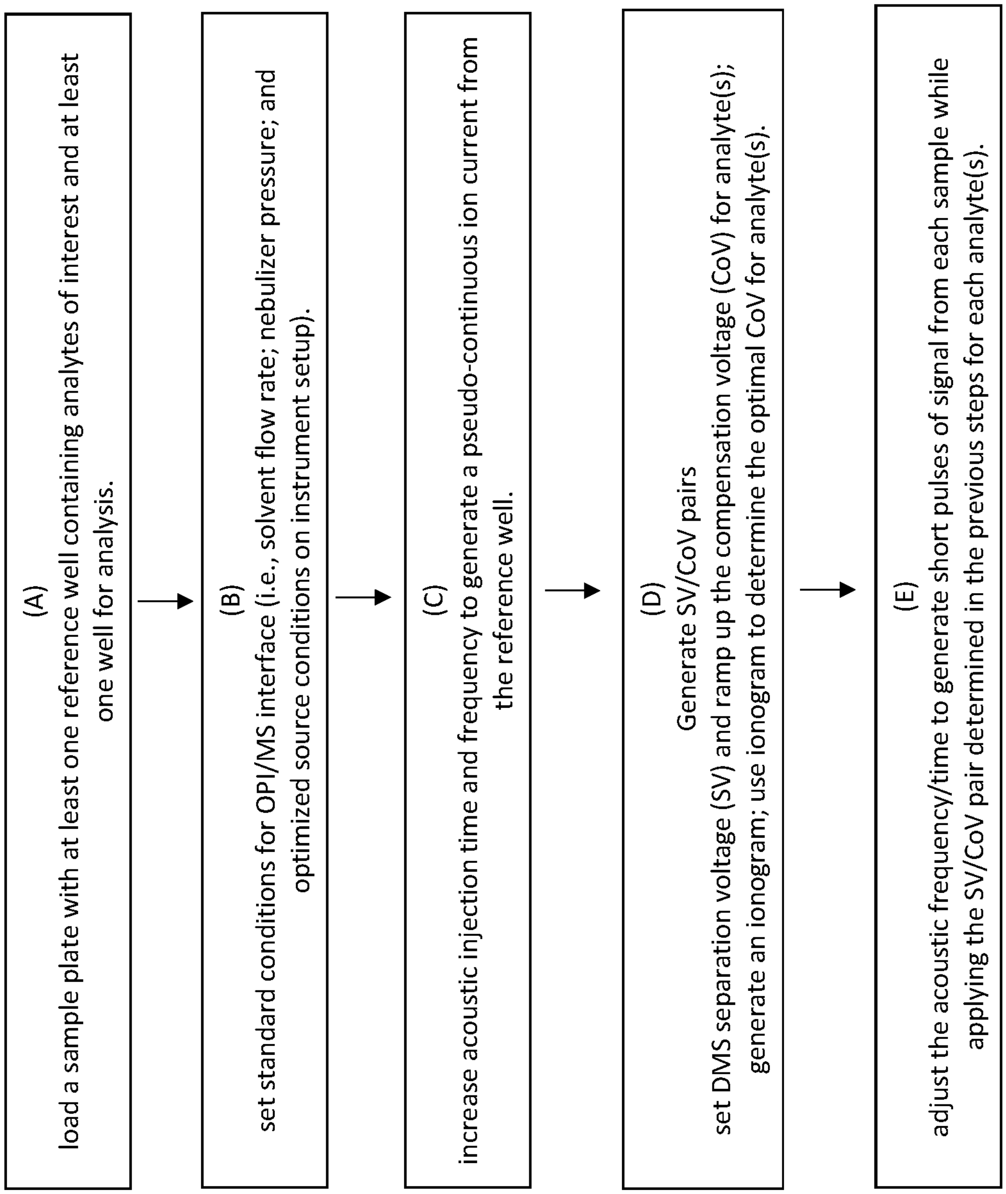
FIG. 5 provides an overview of a sample analysis in accordance with an example embodiment of the disclosure.

Example 2: DMS Optimization for a Series of Samples Using Pseudo-Continuous Signal in AEMS As discussed above, DMS conditions are typically determined and/or optimized by generating a continuous sample signal (i.e. by infusion) and ramping the CoV under conditions similar to the methods described herein. This example illustrates an embodiment in accordance with some of the aspects of the disclosure demonstrating that the pseudo-continuous signal generated by an AEMS operating at a lower sample ejection frequency can be used to optimize DMS settings, without the need for substantial modifications to the instrument hardware (e.g., no need to detach/attach hardware). One example of a DMS method is generally outlined in FIG. 5 and comprises a reference well containing analyte(s) of interest and a sample well for analysis. Referring to FIG. 5, (A) a sample plate is loaded with at least one reference well containing analyte(s) of interest and at least one well for analysis. Standard conditions are set (B) for the AEMS, such as solvent flow rate, nebulizer pressure, source conditions, etc., for the OPI/MS interface. Conditions (C) include setting acoustic droplet ejection time and frequency to generate a pseudo-continuous ion current from the reference well. Voltages on the DMS are set (D), including the SV and the CoV, which may be ramped for each analyte, to generate an ionogram which can be used to determine an optimal CoV (of SV/CoV pair) for each analyte of interest. Adjust the acoustic droplet ejection time and frequency (E) to generate short pulses of signal from each well containing sample for analysis, while applying the SV/CoV pair relationship determined in the previous steps for each analyte of interest (e.g., acquire signal in a discontinuous mode). As one of skill can appreciate, the method allows for the selection of a SV/CoV pair that can be chosen based on maximum signal of the analyte and/or best selectivity for the analyte among a mixture of other analytes and/or interferences. Since the solvent applied to the OPI is maintained at a constant flow rate and the injected sample is a very small fraction of the total flow, the optimal temperature and gas flow settings for the AEMS system and DMS remain constant when switching between discontinuous and pseudo-continuous modes. Therefore, the DMS parameter optimized in pseudo-continuous mode are also optimized for discontinuous mode, eliminating the need for extensive hardware modifications between optimization and sample analysis.

Figure 6:
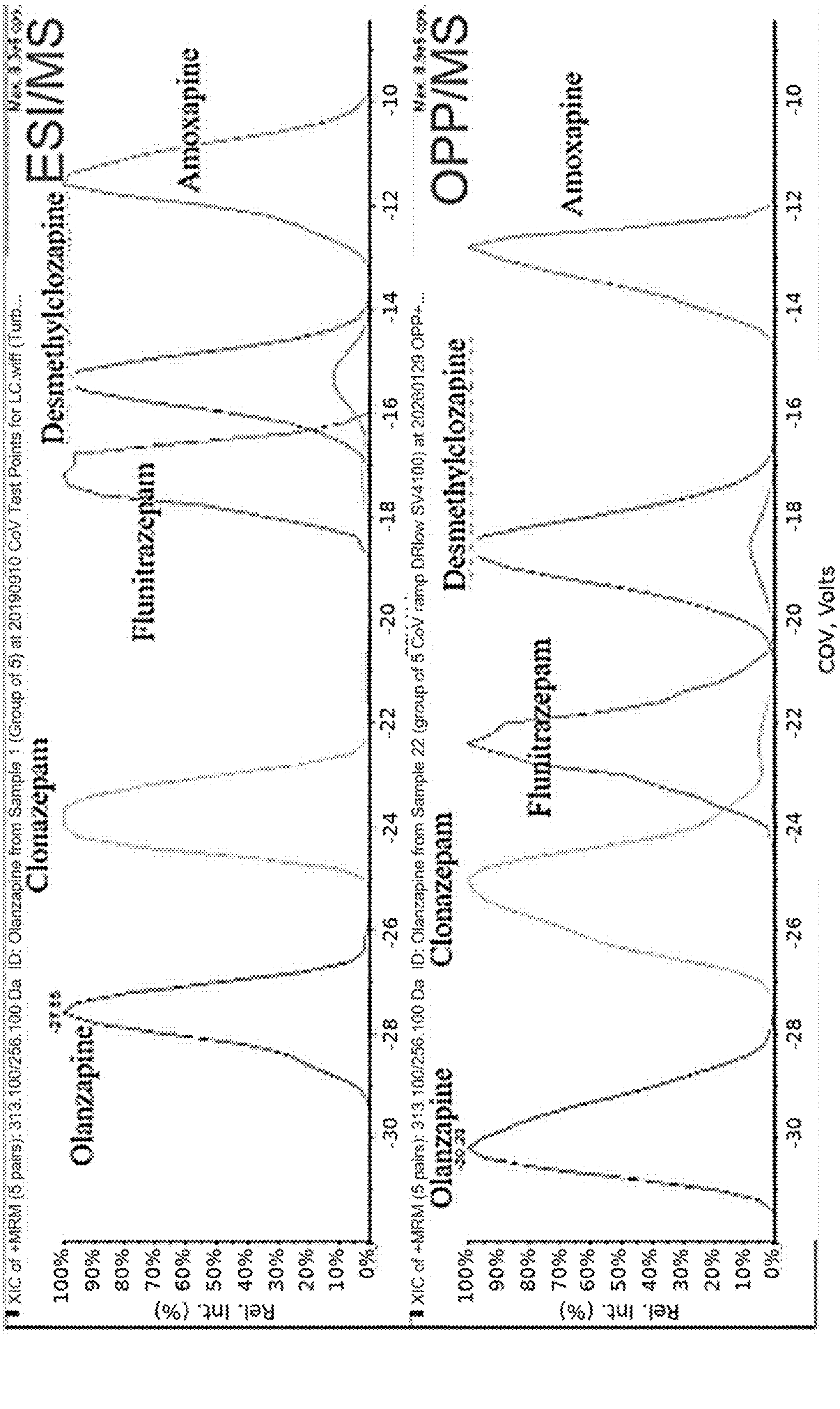
FIG. 6 illustrates an ionogram for a mixture of five benzodiazepines that behave as near isobaric species using standard ESI, and an OPI in accordance with an example embodiment of the disclosure.

Example 3: Selection/Optimization of DMS Separation Parameters with ADE/OPI Pseudo-Continuous Infusion A series of experiments were performed on a mixture of 5 benzodiazepines that are nearly isobaric (olanzapine, clonazepam, flunitrazepam, desmethylclozapine, and amoxapine). FIG. 6 shows ionogram data taken for a standard mixture of 5 benzodiazepines using a standard ESI source configuration (FIG. 6, top panel) and the ADE/OPI (FIG. 6, bottom pane) in accordance with the pseudo-continuous mode of acquisition. The data between the ESI and ADE/OPI configurations are taken with slight differences in DMS temperature creating marginal differences in CoV for each of the compounds, further illustrating the need for constant conditions between CoV optimization and analysis. Referring to the bottom pane, it is apparent that the ADE/OPI system can generate a pseudo-continuous ion signal (10 Hz acoustic frequency) that is sufficient to generate smooth ionogram curves for each of the compounds.

From the ADE/OPI configuration in the bottom pane, it is possible to determine the optimal CoV values for transmission of each of the compounds (i.e. approximately −30 V, −25 V, −22 V, −18.5 V, and −13 V for olanzapine, clonazepam, flunitrazepam, desmethylclozapine, and amoxapine, respectively).

Figure 7A:
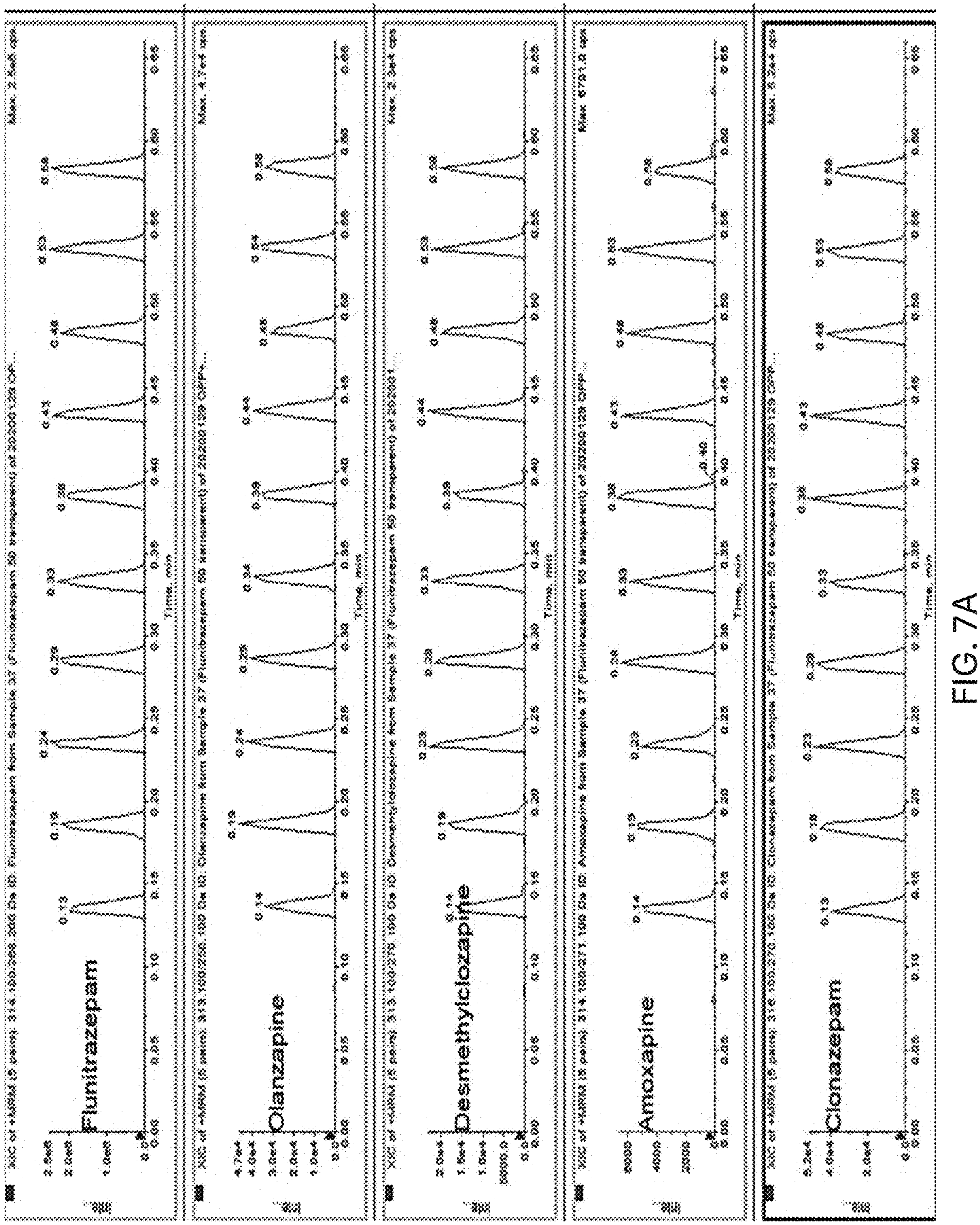
FIGS. 7A and 7B illustrate a series of flunitrazepam injections and interferences that can be reduced or eliminated by methods and systems in accordance with an example embodiment of the disclosure.
Figure 7B:
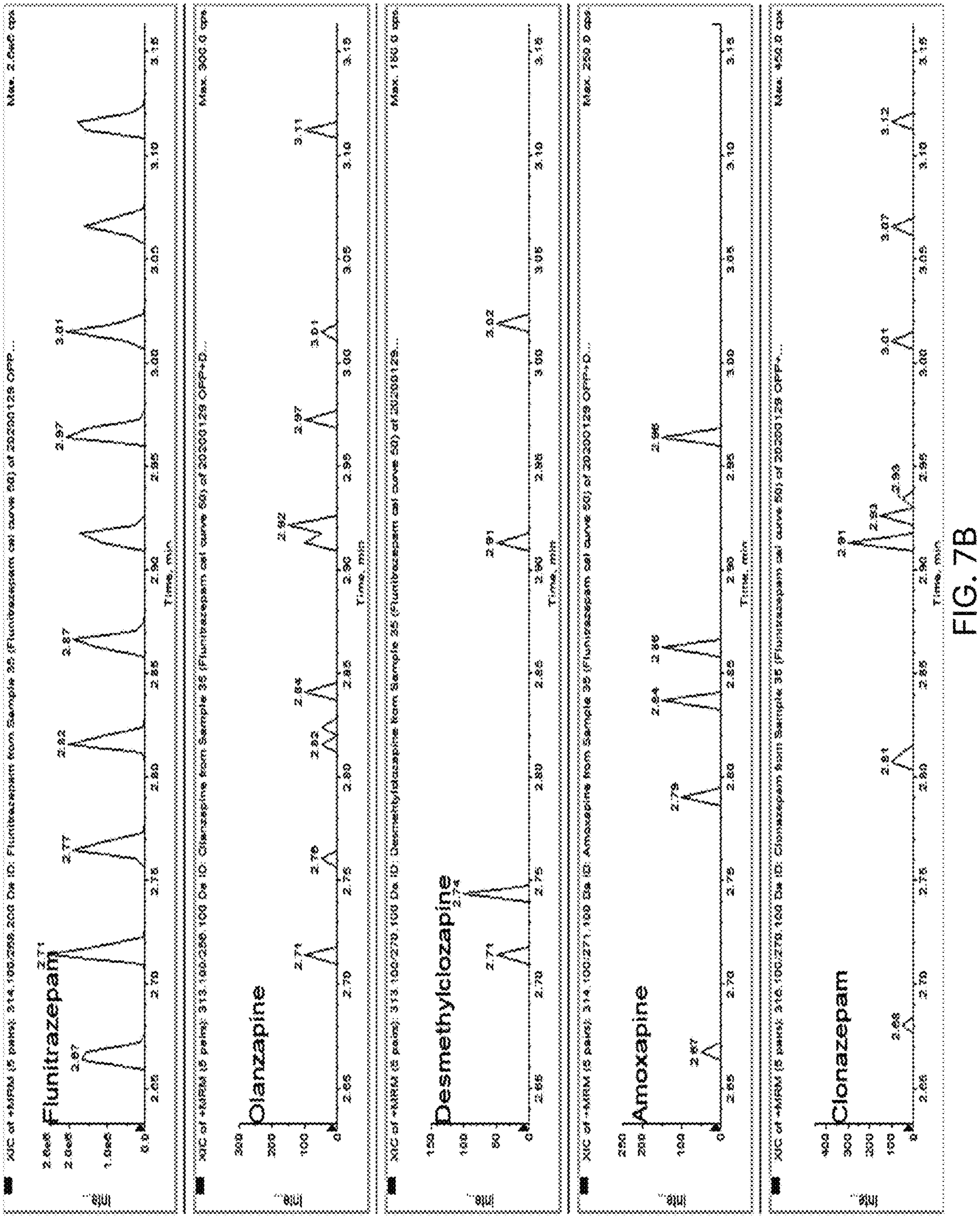

Example 4: DMS Parameters Optimized by Pseudo-Continuous Infusion are Stable for Pulsed (Discontinuous) Operation To demonstrate that the DMS parameters determined in Example 3 are effective for pulsed operation, a series of acoustic injections are monitored for each of the 5 compounds shown in FIG. 6. FIGS. 7A and 7B show data taken for injection of flunitrazepam. The data in FIG. 7A was taken with the DMS set to transparent mode (i.e. DMS separation turned off). When flunitrazepam was injected, substantial signal was measured for the flunitrazepam MRM signal (top pane) as well as interferences in the MRM channels for each of the other 4 compounds (4 panes below, for olanzapine, desmethylclozapine, amoxapine, and clonazepam). These data highlight the importance of adding some type of separation mechanism for acoustic OPI analyses. For the data in FIG. 7B, the DMS separation voltage was enabled and the optimal CoV values were selected for each of the 5 compounds using the data from FIG. 6. As shown in FIG. 7B, substantial signal was measured for the MRM transition corresponding to flunitrazepam. The interference signals in the other 4 MRM channels were completely eliminated as a result of DMS filtering.

Example 5: Using the Proposed Workflow for Quantitation by AEMS (OPI/DMS/MS)

Figure 8:
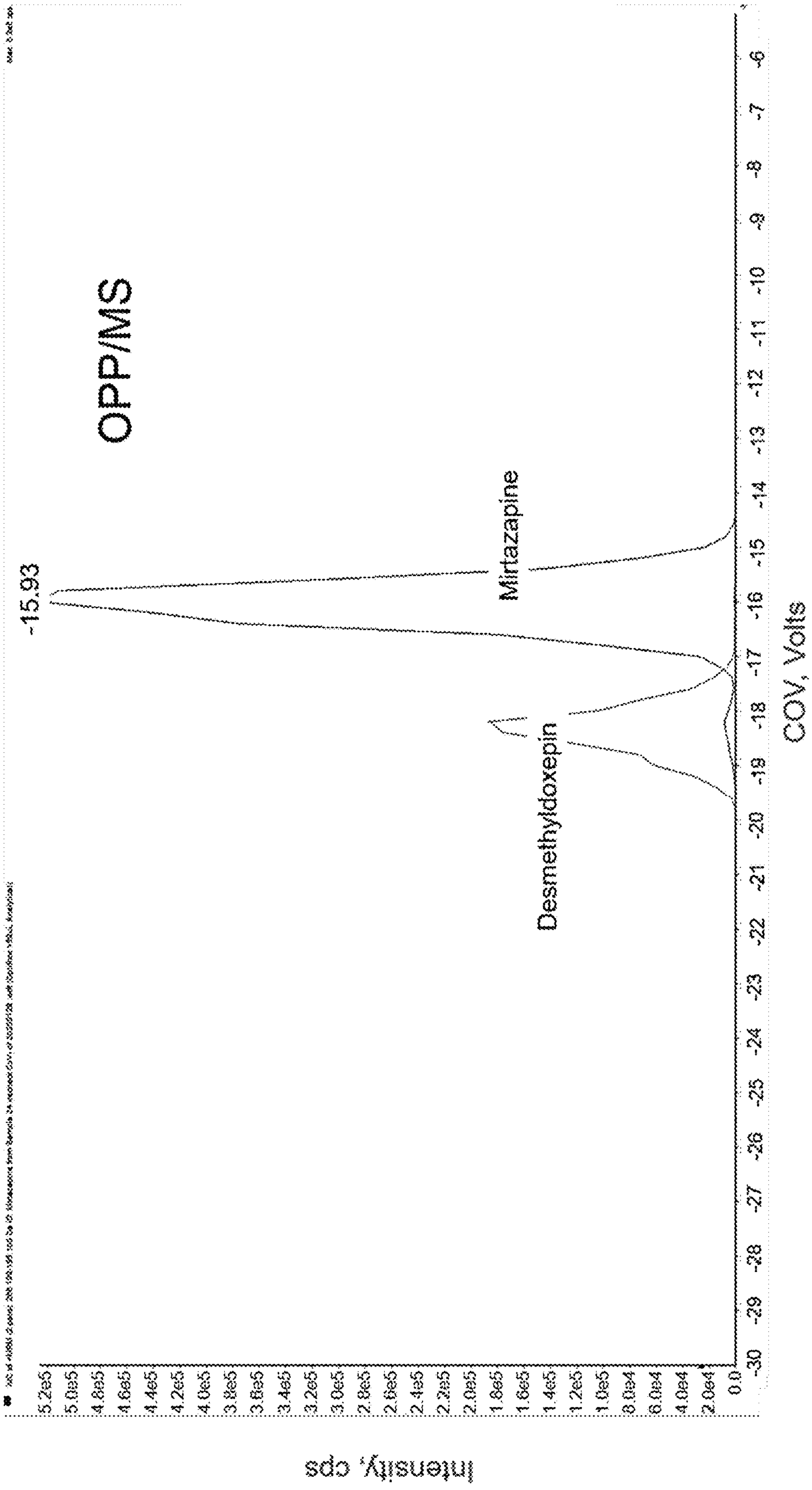
FIG. 8 illustrates an ionogram for the isobaric compounds mirtazapine and desmethyldoxepin in accordance with an example embodiment of the disclosure.

FIG. 8 shows ionogram data taken by pseudo-continuous infusion in an AEMS (OPI/DMS) system for the isobaric compounds mirtazapine and desmethyldoxepin. The acoustic frequency was set to 10 Hz for these data and the optimal CoV values were −18.5 V and −16 V for desmethyldoxepin and mirtazapine, respectively.

Figure 9A:
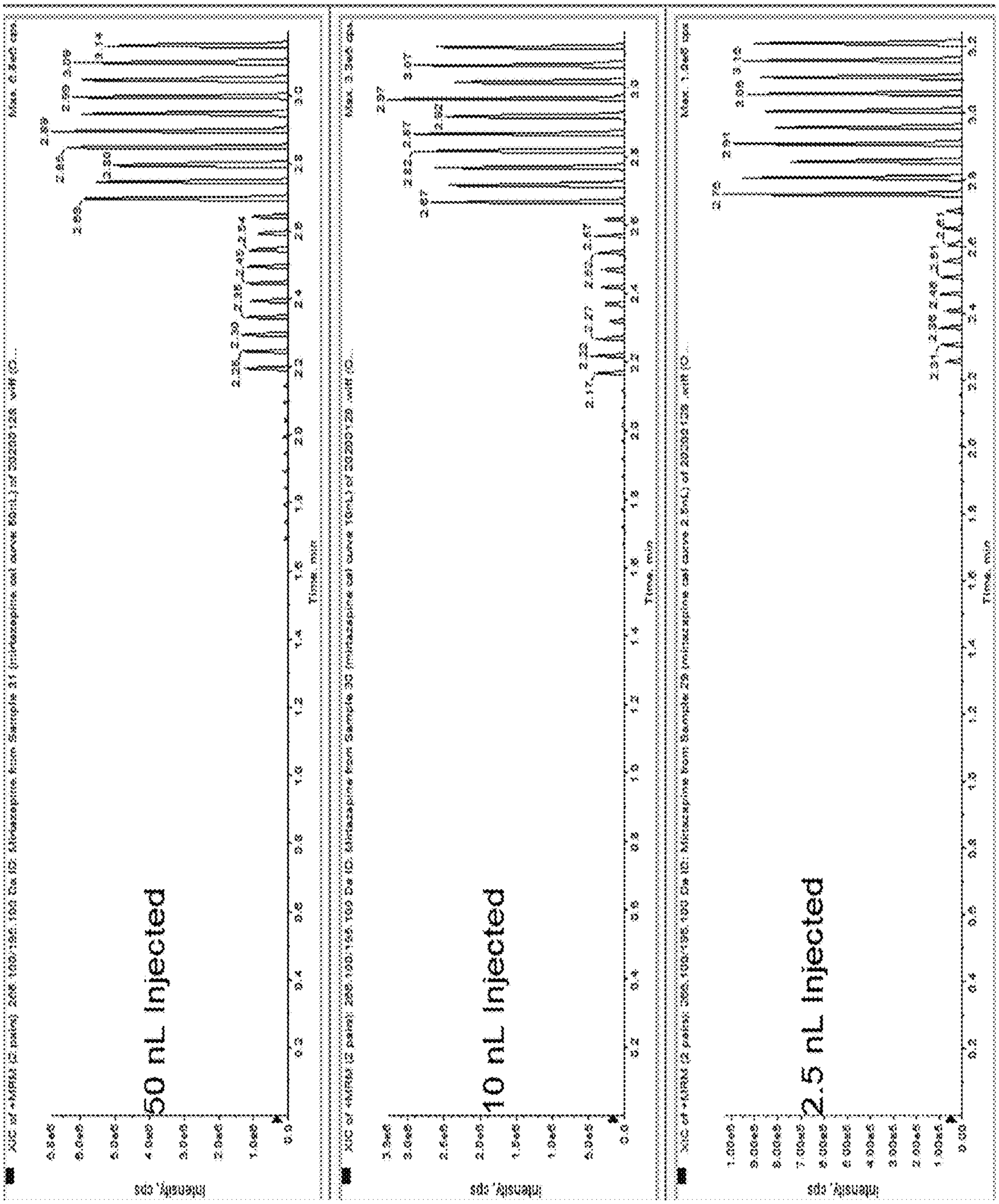
FIGS. 9A and 9B illustrate a series of injections of mirtazapine standards at various concentrations, in accordance with an example embodiment of the disclosure.
Figure 9B:
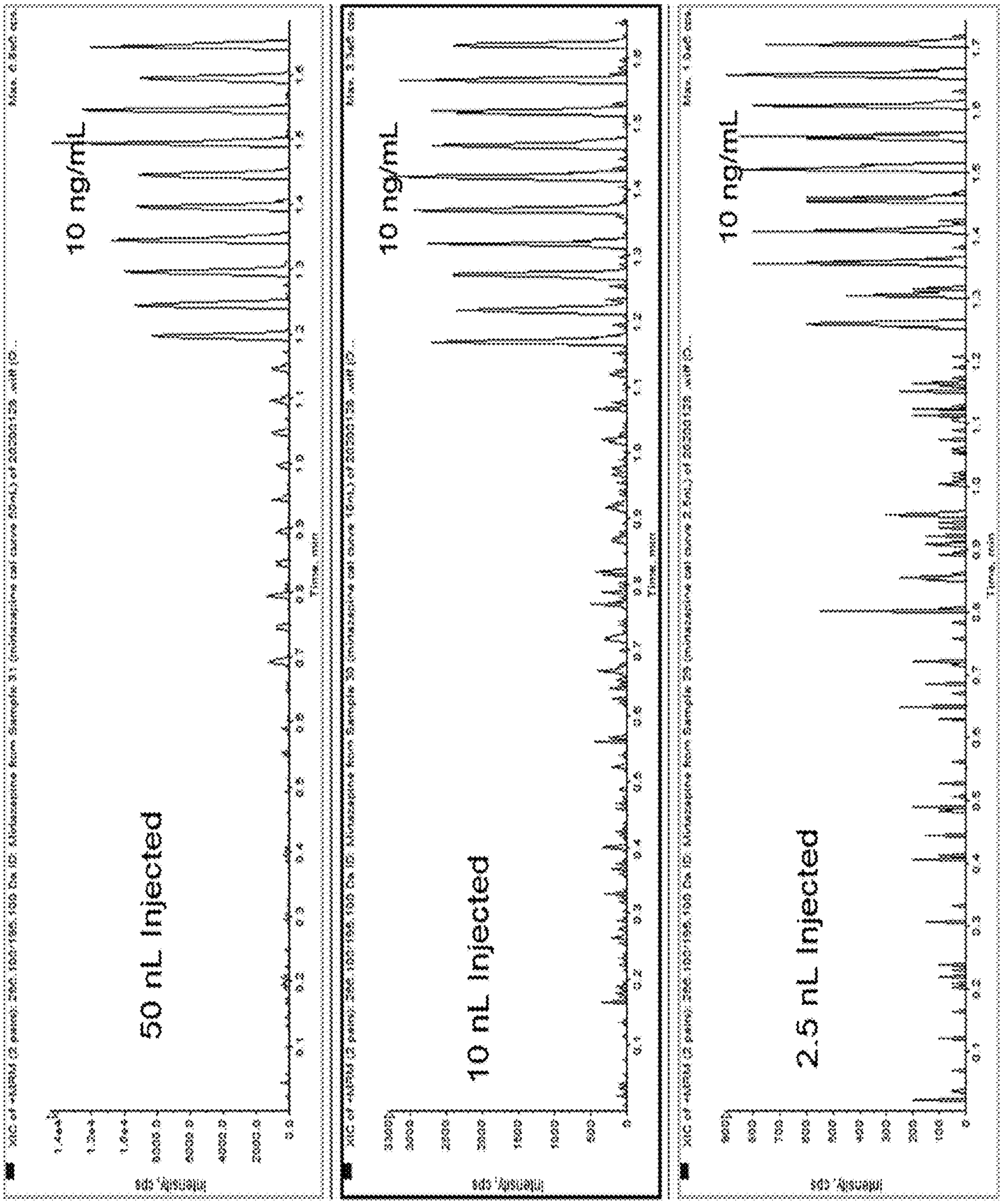

Analytical standards of mirtazapine were prepared to generate calibration curves using the CoV value determined from FIG. 8. FIGS. 9A and 9B show an example of calibration curve data collected using 3 different acoustic injection volumes for the mirtazapine standards. FIG. 9A shows data acquired for a series of injections for various concentrations of mirtazapine, including 0 ng/mL, 1 ng/mL, 10 ng/mL, 100 ng/mL, 1000 ng/mL, and 10,000 ng/mL. FIG. 9B shows a blow-up of the injections of 0 ng/mL, 1 ng/mL, and 10 ng/mL.

Figure 10A:
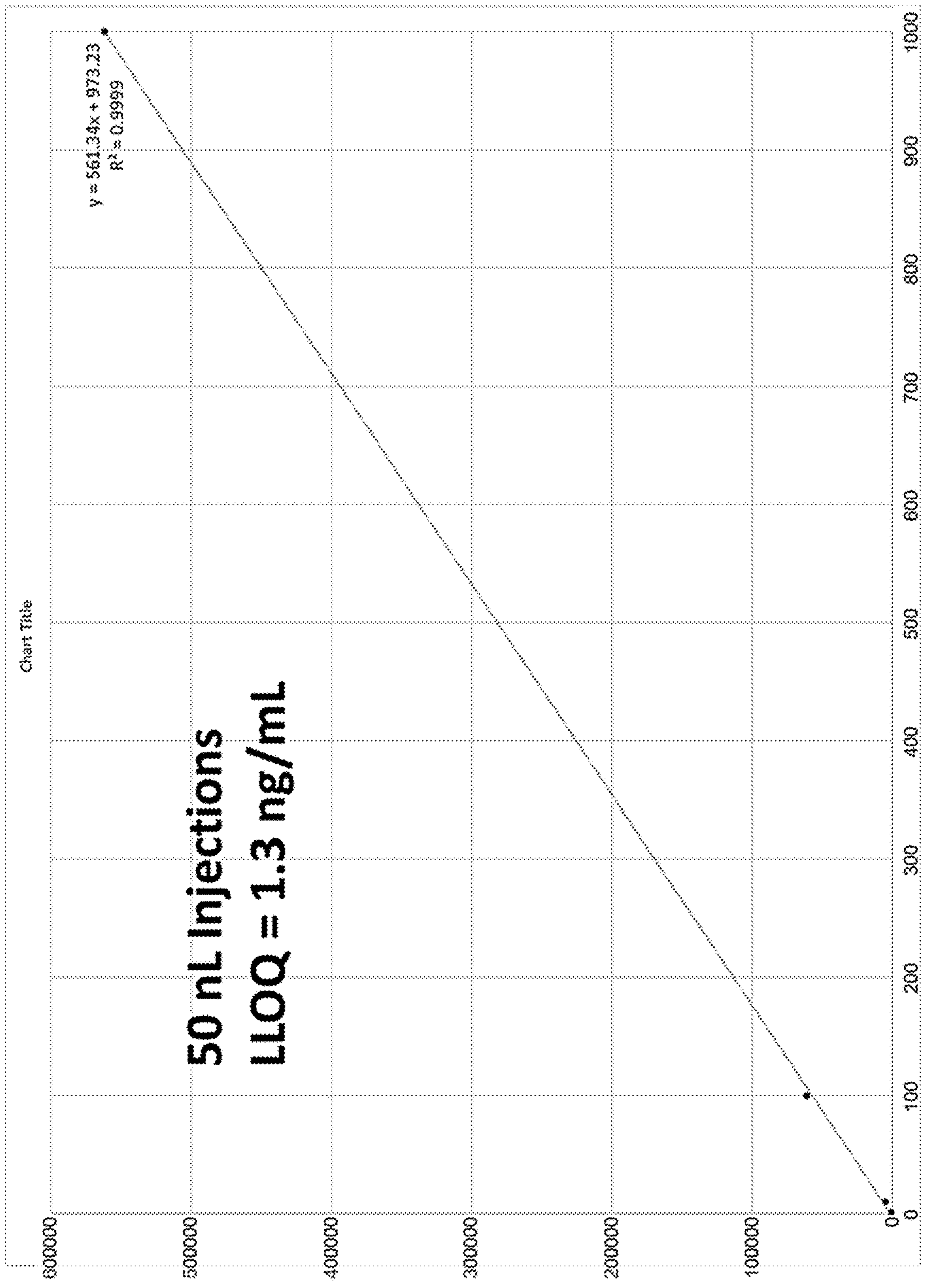
FIGS. 10A-10C illustrate a series of linear calibration curves generated from the mirtazapine standards depicted in FIGS. 9A and 9B, in accordance with an example embodiment of the disclosure.
Figure 10B:
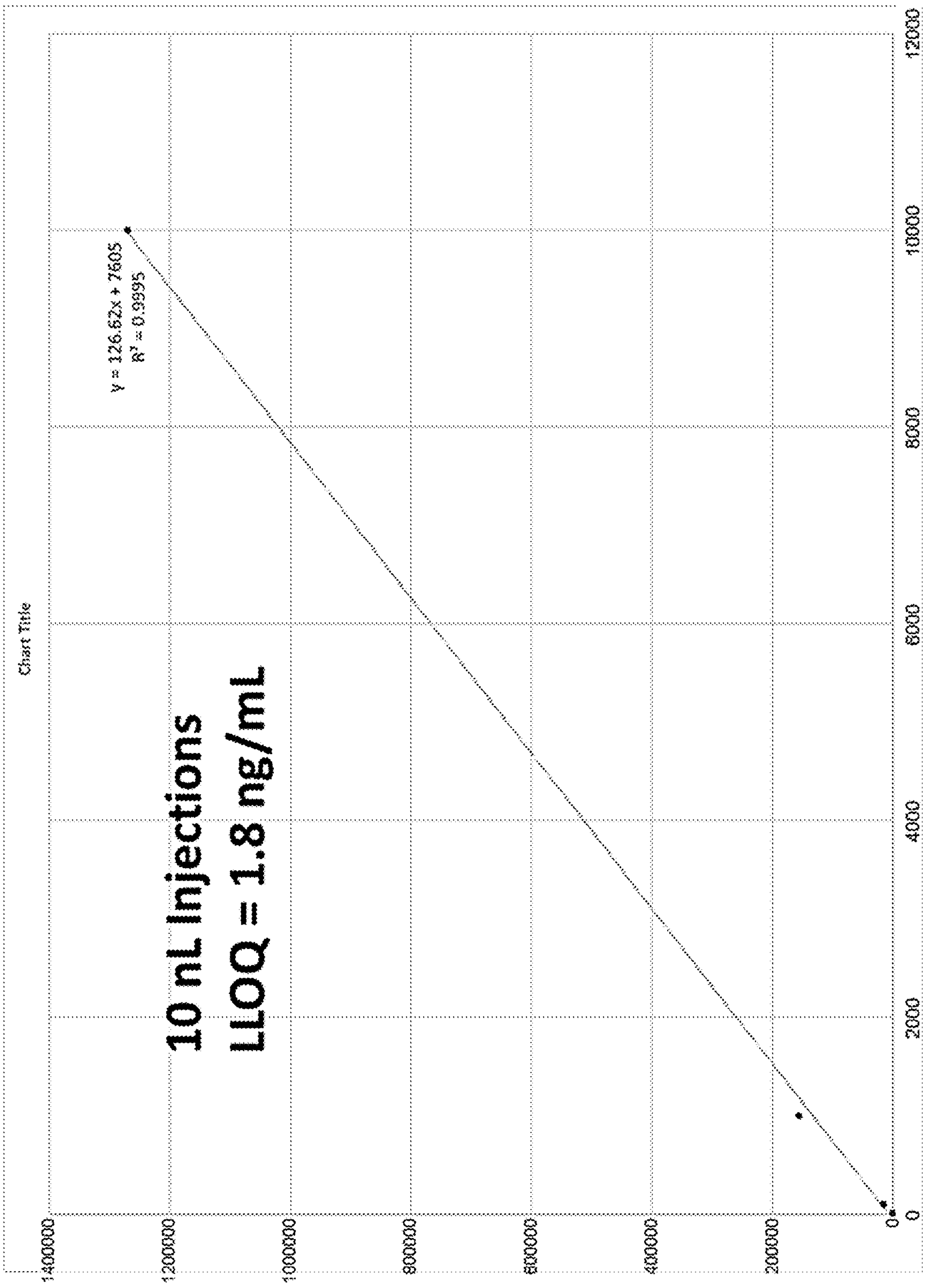
Figure 10C:
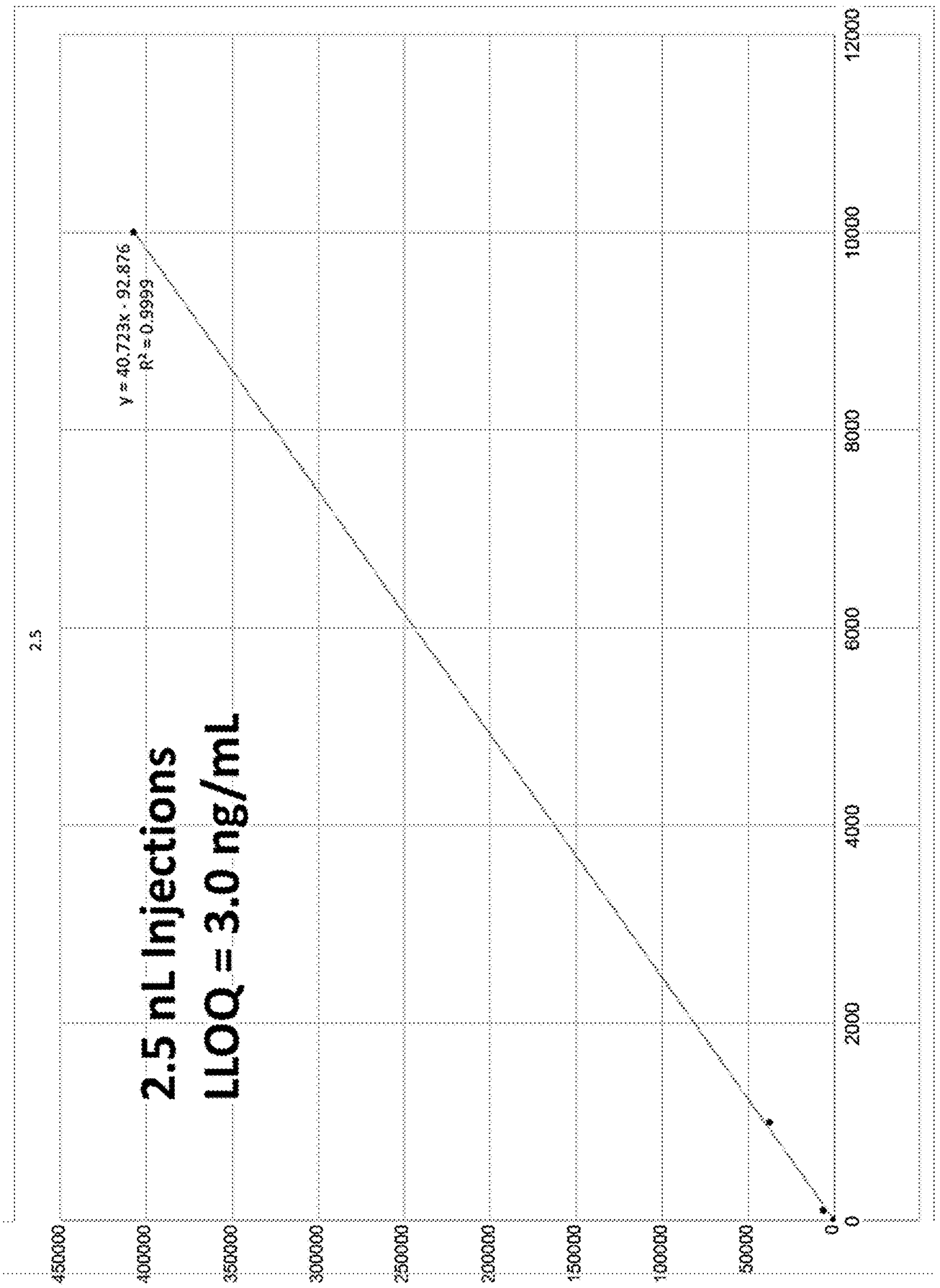

Peak areas were extracted from the data of FIGS. 9A and 9B and calibration curves were plotted as shown in FIGS. 10A-10C. Linear calibration curves were generated with each of the injection volumes, and the calculated limit of quantitation was 1.3 ng/ml, 1.8 ng/ml, and 3.0 ng/ml for injections of 2.5 nL, 10 nL, and 50 nL, respectively.

The disclosure and illustrative examples provide the first demonstration of a method/mode of operating an AEMS equipped with a DMS that can be used to determine tuned/optimized DMS settings without the need to substantially modify or adjust system components. Accordingly, the disclosure enables a simple addition of DMS to ADE/OPI/MS for method and analysis workflows. The methods simplify the optimization process for DMS settings when included in an OPI and ADE MS (AEMS) system. Further incorporated automated methods and techniques can help eliminate any user error that can be introduced during the DMS optimization process.

What is claimed is:

1. A method for operating an acoustic ejection mass spectrometer (AEMS) with a differential mobility spectrometer (DMS) for ion selection, the method comprising:

ejecting a first sample into an open port interface (OPI) to provide a pseudo-continuous signal of ion detection at the mass spectrometer (MS);

evaluating ion detection intensity for a plurality of separation voltage (SV)/compensation voltage (CoV) pair settings of the DMS, wherein the evaluating ion detection intensity for a plurality of SV/CoV pair settings of the DMS comprises ramping CoV over a plurality of values for at least one SV; and selecting an SV/CoV pair to use for analysis.

2. The method of claim 1, further comprising:

ejecting a second sample into the open port interface to provide a discontinuous signal of ion detection at the MS;

applying the selected SV/CoV pair to the DMS; and analyzing second sample ions detected by the MS.

3. The method of claim 2, wherein the discontinuous signal is provided by a discontinuous dilution of the second sample in a capture liquid in the OPI over a period of time that is shorter than the time sufficient to evaluate the SV/CoV pairs.

4. The method of claim 2, wherein the first sample and the second sample comprise an analysis sample for evaluation.

5. The method of claim 2, wherein the ejecting to provide a discontinuous signal comprises ejecting for less than 5 seconds, and optionally for less than a continuous 2 seconds.

6. The method of claim 2, wherein the ejecting to provide a discontinuous signal comprises ejecting for less than a continuous 0.2 seconds, pausing for at least 0.2 seconds, and ejecting a next sample for less than a continuous 0.2 seconds.

7. The method of claim 2, wherein the ejecting to provide a discontinuous signal comprises ejecting less than about 300 nL, pausing for at least 0.2 seconds, and ejecting a less than about 300 nL from a next sample.

8. The method of claim 1, wherein the pseudo-continuous signal is provided by a consistent dilution of the first sample in a capture liquid in the OPI over a period of time sufficient to evaluate the SV/CoV pairs.

9. The method of claim 1, wherein the ejecting to provide a pseudo-continuous signal comprises ejecting for at least a continuous 10 seconds, and optionally for at least a continuous minute.

10. The method of claim 1, wherein the SV/CoV pair is further selected by:

repeating the ejection of the first sample for a plurality of samples; and selecting the SV/CoV pair by comparing the ion intensity for each of the samples at each of the SV/CoV pairs to select the SV/CoV pair that provides selectivity between the plurality of samples.

11. The method of claim 1, wherein ejecting the first sample comprises pseudo-continuously delivering a calibration sample over a calibration period while evaluating a plurality of SV/CoV pairs to select an analysis SV/CoV pair for use in analysis; and ii) delivering a plurality of separate analysis samples via separate ejections while applying the selected analysis SV/COV pair.

12. The method of claim 1, further comprising ramping CoV over a plurality of values for each of a plurality of SV values.

13. A system for analyzing samples, the system comprising:

a MS for detecting ions of interest;

an ADE for acoustically ejecting sample droplets;

an OPI for capturing ejected sample droplets, diluting the captured sample, and transporting the diluted sample to an ion source of the MS for ionization;

a DMS operative to apply a varying electric field to selectively transmit ions based on ion mobility through the varying electric field;

wherein the ADE is operative to repeatedly eject sample droplets in a pseudo-continuous mode to produce a pseudo-continuous ion signal detected by the MS while evaluating a plurality of SV/CoV pair settings of the DMS to select an SV/CoV pair to use for analysis, and wherein the ADE is further operative to eject sample droplets in a discontinuous mode while the selected SV/CoV pair is applied to the DMS to transmit a pulse of ions to the MS for analysis.

14. The system of claim 13, wherein the system further comprises:

a modifier supply, and wherein the system is further operative to supply modifier from the modifier supply to the DMS.

15. The system of claim 13, wherein the system is further operative to:

repeatedly eject droplets at a first droplet ejection rate to provide a consistent sample volume in the pseudo-continuous mode, and eject droplets at a second droplet ejection rate in the discontinuous mode.

16. The system of claim 13, wherein the system is further operative to:

repeatedly eject droplets for more than about 10 seconds in the pseudo-continuous mode, and optionally for more than about 1 minute in the pseudo-continuous mode.

17. The system of claim 13, wherein the system is further operative to:

eject droplets for less than about 5 seconds in the discontinuous mode and pause before ejecting a next sample, and optionally for less than about 2 seconds in the discontinuous mode and pause before ejecting a next sample.

18. The system of claim 13, wherein the system is operative to:

repeatedly eject droplets for more than about 10 seconds in the pseudo-continuous mode, and, eject droplets from each of a plurality of samples to provide sample dilutions to the MS about once every 1-3 seconds.

19. The system of claim 13, wherein the DMS comprises a curved electrode FAIMS DMS device wherein the compensation voltage (CoV) comprises a compensation voltage (CV) and wherein the separation voltage (SV) comprises a dispersion voltage (DV).

* * * * *